US010033686B2

(12) United States Patent
Pesavento et al.

(10) Patent No.: US 10,033,686 B2
(45) Date of Patent: Jul. 24, 2018

(54) COMPUTERIZED SYSTEM AND METHOD FOR AUTOMATICALLY CREATING AND COMMUNICATING MEDIA STREAMS OF DIGITAL CONTENT

(71) Applicant: OATH INC., New York, NY (US)

(72) Inventors: Gerry Pesavento, San Francisco, CA (US); Anastasia Svetlichnaya, San Francisco, CA (US); Pierre Garrigues, San Francisco, CA (US); Rob Hess, San Francisco, CA (US)

(73) Assignee: OATH INC., New York, NY (US)

( * ) Notice: Subject to any disclaimer, the term of this patent is extended or adjusted under 35 U.S.C. 154(b) by 66 days.

(21) Appl. No.: 15/161,883

(22) Filed: May 23, 2016

(65) Prior Publication Data

US 2017/0339093 A1    Nov. 23, 2017

(51) Int. Cl.
| | | |
|---|---|---|
| *H04L 12/58* | (2006.01) | |
| *H04L 29/08* | (2006.01) | |
| *H04L 12/26* | (2006.01) | |
| *G06F 17/30* | (2006.01) | |
| *G06Q 30/02* | (2012.01) | |

(Continued)

(52) U.S. Cl.
CPC ........ *H04L 51/32* (2013.01); *G06F 17/30035* (2013.01); *G06F 17/30867* (2013.01); *G06N 3/063* (2013.01); *G06Q 30/0269* (2013.01); *H04L 43/08* (2013.01); *H04L 67/10* (2013.01); *G06Q 50/01* (2013.01)

(58) Field of Classification Search
CPC .......................... G06Q 50/01; G06Q 30/0201; G06F 3/04842; G06F 17/30867; G06F 3/0482; G06F 17/30528; G06F 17/3053; H04L 67/306; H04L 51/32; H04L 67/22; H04N 21/6125; H04N 21/85
See application file for complete search history.

(56) References Cited

U.S. PATENT DOCUMENTS 8,171,128 B2 * 5/2012 Zuckerberg ............ G06Q 30/02
707/702
8,775,341 B1 * 7/2014 Commons ............ G06N 3/0454
706/20

(Continued)

*Primary Examiner* — Sargon Nano
(74) *Attorney, Agent, or Firm* — James J. DeCarlo; Greenberg Traurig, LLP

(57) ABSTRACT

Disclosed are systems and methods for improving interactions with and between computers in content generating, searching, hosting and/or providing systems supported by or configured with personal computing devices, servers and/or platforms. The systems interact to identify and retrieve data within or across platforms, which can be used to improve the quality of data used in processing interactions between or among processors in such systems. The disclosed systems and methods automatically identify and communicate media content to users as the media content is uploaded to the internet. The disclosed systems and methods leverage an internet hosted data firehose in order to build and communicate streams of content that are relevant to users' determined interests. Real-time analysis of the continuous stream of content results in curated media streams being created and communicated to users thereby stimulating social interactivity between users and automating the discovery of other users on a network.

20 Claims, 7 Drawing Sheets

(51) Int. Cl.
*G06N 3/063* (2006.01)
*G06Q 50/00* (2012.01)

(56) References Cited

U.S. PATENT DOCUMENTS

| | | | | |
|---|---|---|---|---|
| 8,782,080 B2* | 7/2014 | Lee | | G06F 17/30979 |
| | | | | 707/771 |
| 8,868,439 B2* | 10/2014 | Spektor | | G06F 21/316 |
| | | | | 705/7.11 |
| 2006/0265329 A1* | 11/2006 | Hug | | H04N 7/17309 |
| | | | | 705/50 |
| 2007/0124285 A1* | 5/2007 | Wright | | G06F 17/30489 |
| 2011/0264522 A1* | 10/2011 | Chan | | G06Q 30/02 |
| | | | | 705/14.52 |
| 2012/0197995 A1* | 8/2012 | Caruso | | G06F 17/3089 |
| | | | | 709/204 |
| 2012/0278329 A1* | 11/2012 | Borggaard | | G06F 17/30699 |
| | | | | 707/738 |
| 2013/0031034 A1* | 1/2013 | Gubin | | G06Q 10/06393 |
| | | | | 706/12 |
| 2013/0031489 A1* | 1/2013 | Gubin | | G06Q 10/10 |
| | | | | 715/753 |
| 2013/0073400 A1* | 3/2013 | Heath | | G06Q 30/02 |
| | | | | 705/14.73 |
| 2013/0073473 A1* | 3/2013 | Heath | | G06Q 30/02 |
| | | | | 705/319 |
| 2013/0124538 A1* | 5/2013 | Lee | | G06F 17/3053 |
| | | | | 707/749 |
| 2014/0108562 A1* | 4/2014 | Panzer | | G06Q 10/10 |
| | | | | 709/206 |
| 2014/0195921 A1* | 7/2014 | Grosz | | G06F 3/1242 |
| | | | | 715/738 |
| 2014/0223488 A1* | 8/2014 | Korst | | H04N 21/4668 |
| | | | | 725/53 |
| 2015/0026225 A1* | 1/2015 | Bastide | | G06F 17/3012 |
| | | | | 707/825 |

* cited by examiner

COMPUTERIZED SYSTEM AND METHOD FOR AUTOMATICALLY CREATING AND COMMUNICATING MEDIA STREAMS OF DIGITAL CONTENT

This application includes material that is subject to copyright protection. The copyright owner has no objection to the facsimile reproduction by anyone of the patent disclosure, as it appears in the Patent and Trademark Office files or records, but otherwise reserves all copyright rights whatsoever.

FIELD

The present disclosure relates generally to improving the performance of content generating, searching, providing and/or hosting computer systems and/or platforms by modifying the capabilities and providing non-native functionality to such systems and/or platforms for automatically creating and continuously communicating media streams.

SUMMARY

The present disclosure provides novel systems and methods for identifying and communicating media content to users that is determined to be of interest to the users as the media content is uploaded to the internet. The disclosed systems and methods effectuate an entirely automated interest-based network that automatically delivers media content to users as such content becomes available to the internet.

Currently with conventional systems, media content is manually curated for particular sets of users. For example, a group of users manually joins and/or creates groups centered around a content category. Then, content hosted or communicated over the internet (e.g., on a social networking platform or photo-sharing site) is associated with the category based on manual identification by a user and/or according to a set of user predetermined parameters. This identified content is then communicated to those users that have joined the group. Such groups have limited growth because they require manual intervention in keeping the communicated content relevant, of a particular quality and secure. Furthermore, the vast majority of content communicated over the internet goes undiscovered because such content does not have the requisite metadata for conventional systems to search and discover them. Thus, a group administrator or preset set of parameters for identifying new content cannot easily and efficiently find the ideal and desired content for a group.

The present disclosure provides computerized systems and methods that are able to leverage the previously untapped resources of data firehoses resident on the internet and the content platforms hosted therein in order to build media streams of content that are spatially, topically and temporally relevant to users' interests. As discussed in detail below, leveraging of an internet hosted and enabled data firehose results in the generation of a continuous stream of content that can be communicated to interested or targeted users, which stimulates social interactivity between users and automates the previously static and manual techniques for discovery of new content and other users on or over a network.

As discussed herein, as understood by those of skill in the art, a firehose of data (or data firehose) is a steady stream of all available real-time data from an internet/network source. For purposes of this disclosure, the firehose, in a non-limiting embodiment, comprises all data and metadata associated with the upload, hosting and storage of internet content. For example, upon a user uploading an image file to the Flickr® platform, it will be understood that the firehose data associated therewith can include, but is not limited to, the data and metadata of the uploaded image and the uploading user.

Therefore, the disclosed systems and methods leverage such data in order to target users with relevant content to their determined interests which leads to users being provided with previously undiscovered content as well as the ability to form new relationships with like-minded (similarly interested) users. According to some embodiments of the instant disclosure, the disclosed systems and methods generate highly accurate (to user interests) streams (or feeds) of content from a firehose that are distributed to users on a social network(s).

In accordance with one or more embodiments, a method is disclosed for automatically creating streams of media content, and providing such content streams to interested users as it is uploaded to the internet. Such disclosed method, inter alfa, as discussed herein, automates social growth between users and across internet platforms while delivering users interest-satisfying content that was previously undiscoverable prior to the implementation of the disclosed systems and methods.

In accordance with one or more embodiments, a non-transitory computer-readable storage medium is provided, the non-transitory computer-readable storage medium tangibly storing thereon, or having tangibly encoded thereon, computer readable instructions that when executed cause at least one processor to perform a method for automatically creating and continuously communicating media streams of visual content for an interest-based social network.

In accordance with one or more embodiments, a system is provided that comprises one or more computing devices configured to provide functionality in accordance with such embodiments. In accordance with one or more embodiments, functionality is embodied in steps of a method performed by at least one computing device. In accordance with one or more embodiments, program code (or program logic) executed by a processor(s) of a computing device to implement functionality in accordance with one or more such embodiments is embodied in, by and/or on a non-transitory computer-readable medium.

BRIEF DESCRIPTION OF THE DRAWINGS

The foregoing and other objects, features, and advantages of the disclosure will be apparent from the following description of embodiments as illustrated in the accompanying drawings, in which reference characters refer to the same parts throughout the various views. The drawings are not necessarily to scale, emphasis instead being placed upon illustrating principles of the disclosure.

DESCRIPTION OF EMBODIMENTS

Figure 1:
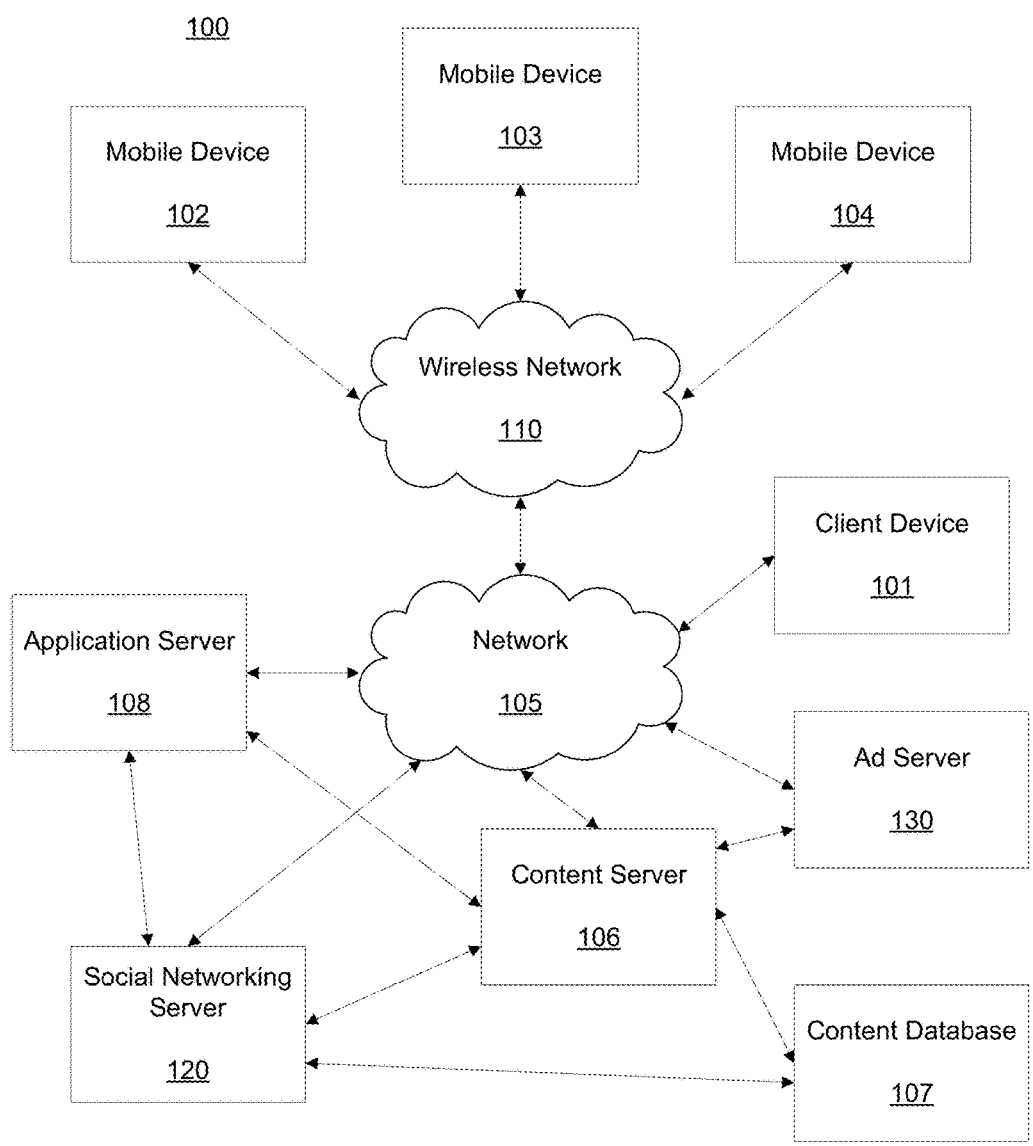
FIG. 1 is a schematic diagram illustrating an example of a network within which the systems and methods disclosed herein could be implemented according to some embodiments of the present disclosure.

The present disclosure will now be described more fully hereinafter with reference to the accompanying drawings, which form a part hereof, and which show, by way of illustration, certain example embodiments. Subject matter may, however, be embodied in a variety of different forms and, therefore, covered or claimed subject matter is intended to be construed as not being limited to any example embodiments set forth herein; example embodiments are provided merely to be illustrative. Likewise, a reasonably broad scope for claimed or covered subject matter is intended. Among other things, for example, subject matter may be embodied as methods, devices, components, or systems. Accordingly, embodiments may, for example, take the form of hardware, software, firmware or any combination thereof (other than software per se). The following detailed description is, therefore, not intended to be taken in a limiting sense.

Throughout the specification and claims, terms may have nuanced meanings suggested or implied in context beyond an explicitly stated meaning. Likewise, the phrase "in one embodiment" as used herein does not necessarily refer to the same embodiment and the phrase "in another embodiment" as used herein does not necessarily refer to a different embodiment. It is intended, for example, that claimed subject matter include combinations of example embodiments in whole or in part.

In general, terminology may be understood at least in part from usage in context. For example, terms, such as "and", "or", or "and/or," as used herein may include a variety of meanings that may depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein, depending at least in part upon context, may be used to describe any feature, structure, or characteristic in a singular sense or may be used to describe combinations of features, structures or characteristics in a plural sense. Similarly, terms, such as "a," "an," or "the," again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

The present disclosure is described below with reference to block diagrams and operational illustrations of methods and devices. It is understood that each block of the block diagrams or operational illustrations, and combinations of blocks in the block diagrams or operational illustrations, can be implemented by means of analog or digital hardware and computer program instructions. These computer program instructions can be provided to a processor of a general purpose computer to alter its function as detailed herein, a special purpose computer, ASIC, or other programmable data processing apparatus, such that the instructions, which execute via the processor of the computer or other programmable data processing apparatus, implement the functions/acts specified in the block diagrams or operational block or blocks. In some alternate implementations, the functions/acts noted in the blocks can occur out of the order noted in the operational illustrations. For example, two blocks shown in succession can in fact be executed substantially concurrently or the blocks can sometimes be executed in the reverse order, depending upon the functionality/acts involved.

These computer program instructions can be provided to a processor of: a general purpose computer to alter its function to a special purpose; a special purpose computer; ASIC; or other programmable digital data processing apparatus, such that the instructions, which execute via the processor of the computer or other programmable data processing apparatus, implement the functions/acts specified in the block diagrams or operational block or blocks, thereby transforming their functionality in accordance with embodiments herein.

For the purposes of this disclosure a computer readable medium (or computer-readable storage medium/media) stores computer data, which data can include computer program code (or computer-executable instructions) that is executable by a computer, in machine readable form. By way of example, and not limitation, a computer readable medium may comprise computer readable storage media, for tangible or fixed storage of data, or communication media for transient interpretation of code-containing signals. Computer readable storage media, as used herein, refers to physical or tangible storage (as opposed to signals) and includes without limitation volatile and non-volatile, removable and non-removable media implemented in any method or technology for the tangible storage of information such as computer-readable instructions, data structures, program modules or other data. Computer readable storage media includes, but is not limited to, RAM, ROM, EPROM, EEPROM, flash memory or other solid state memory technology, CD-ROM, DVD, or other optical storage, magnetic cassettes, magnetic tape, magnetic disk storage or other magnetic storage devices, or any other physical or material medium which can be used to tangibly store the desired information or data or instructions and which can be accessed by a computer or processor.

For the purposes of this disclosure the term "server" should be understood to refer to a service point which provides processing, database, and communication facilities. By way of example, and not limitation, the term "server" can refer to a single, physical processor with associated communications and data storage and database facilities, or it can refer to a networked or clustered complex of processors and associated network and storage devices, as well as operating software and one or more database systems and application software that support the services provided by the server. Servers may vary widely in configuration or capabilities, but generally a server may include one or more central processing units and memory. A server may also include one or more mass storage devices, one or more power supplies, one or more wired or wireless network interfaces, one or more input/output interfaces, or one or more operating systems, such as Windows Server, Mac OS X, Unix, Linux, FreeBSD, or the like.

For the purposes of this disclosure a "network" should be understood to refer to a network that may couple devices so that communications may be exchanged, such as between a server and a client device or other types of devices, including between wireless devices coupled via a wireless network, for example. A network may also include mass storage, such as network attached storage (NAS), a storage area network (SAN), or other forms of computer or machine readable media, for example. A network may include the Internet, one or more local area networks (LANs), one or more wide area networks (WANs), wire-line type connections, wireless type connections, cellular or any combination thereof. Likewise, sub-networks, which may employ differing architectures or may be compliant or compatible with differing protocols, may interoperate within a larger network. Various types of devices may, for example, be made available to provide an interoperable capability for differing architectures or protocols. As one illustrative example, a router may provide a link between otherwise separate and independent LANs.

A communication link or channel may include, for example, analog telephone lines, such as a twisted wire pair, a coaxial cable, full or fractional digital lines including T1, T2, T3, or T4 type lines, Integrated Services Digital Networks (ISDNs), Digital Subscriber Lines (DSLs), wireless links including satellite links, or other communication links or channels, such as may be known to those skilled in the art. Furthermore, a computing device or other related electronic devices may be remotely coupled to a network, such as via a wired or wireless line or link, for example.

For purposes of this disclosure, a "wireless network" should be understood to couple client devices with a network. A wireless network may employ stand-alone ad-hoc networks, mesh networks, Wireless LAN (WLAN) networks, cellular networks, or the like. A wireless network may further include a system of terminals, gateways, routers, or the like coupled by wireless radio links, or the like, which may move freely, randomly or organize themselves arbitrarily, such that network topology may change, at times even rapidly.

A wireless network may further employ a plurality of network access technologies, including Wi-Fi, Long Term Evolution (LTE), WLAN, Wireless Router (WR) mesh, or 2nd, 3rd, or 4th generation (2G, 3G, or 4G) cellular technology, or the like. Network access technologies may enable wide area coverage for devices, such as client devices with varying degrees of mobility, for example.

For example, a network may enable RF or wireless type communication via one or more network access technologies, such as Global System for Mobile communication (GSM), Universal Mobile Telecommunications System (UMTS), General Packet Radio Services (GPRS), Enhanced Data GSM Environment (EDGE), 3GPP Long Term Evolution (LTE), LTE Advanced, Wideband Code Division Multiple Access (WCDMA), Bluetooth, 802.11b/g/n, or the like. A wireless network may include virtually any type of wireless communication mechanism by which signals may be communicated between devices, such as a client device or a computing device, between or within a network, or the like.

A computing device may be capable of sending or receiving signals, such as via a wired or wireless network, or may be capable of processing or storing signals, such as in memory as physical memory states, and may, therefore, operate as a server. Thus, devices capable of operating as a server may include, as examples, dedicated rack-mounted servers, desktop computers, laptop computers, set top boxes, integrated devices combining various features, such as two or more features of the foregoing devices, or the like. Servers may vary widely in configuration or capabilities, but generally a server may include one or more central processing units and memory. A server may also include one or more mass storage devices, one or more power supplies, one or more wired or wireless network interfaces, one or more input/output interfaces, or one or more operating systems, such as Windows Server, Mac OS X, Unix, Linux, FreeBSD, or the like.

For purposes of this disclosure, a client (or consumer or user) device may include a computing device capable of sending or receiving signals, such as via a wired or a wireless network. A client device may, for example, include a desktop computer or a portable device, such as a cellular telephone, a smart phone, a display pager, a radio frequency (RF) device, an infrared (IR) device an Near Field Communication (NFC) device, a Personal Digital Assistant (PDA), a handheld computer, a tablet computer, a phablet, a laptop computer, a set top box, a wearable computer, smart watch, an integrated or distributed device combining various features, such as features of the forgoing devices, or the like.

A client device may vary in terms of capabilities or features. Claimed subject matter is intended to cover a wide range of potential variations. For example, a simple smart phone, phablet or tablet may include a numeric keypad or a display of limited functionality, such as a monochrome liquid crystal display (LCD) for displaying text. In contrast, however, as another example, a web-enabled client device may include a high resolution screen, one or more physical or virtual keyboards, mass storage, one or more accelerometers, one or more gyroscopes, global positioning system (GPS) or other location-identifying type capability, or a display with a high degree of functionality, such as a touch-sensitive color 2D or 3D display, for example.

A client device may include or may execute a variety of operating systems, including a personal computer operating system, such as a Windows, iOS or Linux, or a mobile operating system, such as iOS, Android, or Windows Mobile, or the like.

A client device may include or may execute a variety of possible applications, such as a client software application enabling communication with other devices, such as communicating one or more messages, such as via email, for example Yahoo!® Mail, short message service (SMS), or multimedia message service (MMS), for example Yahoo! Messenger®, including via a network, such as a social network, including, for example, Tumblr®, Facebook®, LinkedIn®, Twitter®, Flickr®, or Google+®, Instagram™, to provide only a few possible examples. A client device may also include or execute an application to communicate content, such as, for example, textual content, multimedia content, or the like. A client device may also include or execute an application to perform a variety of possible tasks, such as browsing, searching, playing or displaying various forms of content, including locally stored or streamed video, or games (such as fantasy sports leagues). The foregoing is provided to illustrate that claimed subject matter is intended to include a wide range of possible features or capabilities.

The principles described herein may be embodied in many different forms. The present disclosure provides novel systems and methods for automatic, real-time creation and communication of media streams.

By way of background, social feeds like Instagram®, Facebook®, WhatsApp®, Twitter®, SnapChat®, and the like, are based on a user following another user in order to be served or provided content. This results in the content a user receives or views being controlled entirely by the posting user. The instant disclosure provides a novel, alternative paradigm by producing visual media streams of content that accurately represents a user's targeted interest by having the content fed to the recipient user controlled by the recipient (or following user).

Further, some social networks have interest "Groups" that enable a user to follow the Group; however, they require an active human administrator to curate the content provided to the Group. Also, in order for a user community to be established for interactivity (or discussions) within the Group, the administrator must set this up. This existing model for user interaction is limited at best as a majority of Groups remain inactive due to a missing administrator or users "not wanting to speak to an empty room." The disclosed systems and methods remedy the existing shortcomings in the art by building a content stream (or, interchangeably referred to as, a feed) that 1) continuously produces content, 2) invites relevant members to the generated social stream, and 3) stimulates social interactivity.

As discussed in more detail below, the disclosed systems and methods automatically discover new, high-quality, relevant, and previously undiscoverable content on a network. This automatic discovery of content results in the ability to provide users with such content, thereby remedying the "cold start" problem for previously undiscovered content. Also, the disclosed systems and methods provide users with the ability to join and/or create groups centered around the identified content, which enables the users to develop relationships with other users also being interested in such content. These features and capabilities provided by the disclosed systems and methods are currently unavailable on existing platforms.

For purposes of this disclosure, "new content" refers to content (e.g., images, text, video, audio, multi-media, RSS feeds, and the like) that has been recently created, uploaded, downloaded, or shared, or even re-blogged/re-posted, such that the presence of such content on a user's account page (e.g., Flickr® or Tumblr® page) is a recent occurrence. Those of skill in the art will understand that "new" or "recent" refers to content's presence satisfying a recency threshold. For example, if the recency threshold is one day or a number of hours or minutes, the content uploaded to the user's Flickr® page during the previous day (or other time period) would qualify as "new content." In some embodiments, "new content" can also refer to content that does not have the requisite social indicators (e.g., a threshold amount of shares, followers or viewership).

As understood by those of skill in the art, the term "quality" or "high-quality" refers to an item of digital content satisfying a quality threshold, which can be set by a user, site administrator, artist creating/capturing the content, the system, service or platform hosting the content, or some combination thereof. In a non-limiting example, "high-quality" can refer to the digital content being of interest to a user(s), where interest (or user engagement) can be based on the number of times a user has interacted with the content (e.g., viewed, shared, commented, downloaded, re-blogged, re-posted, favorited, liked, and the like) at or above the quality threshold. In another non-limiting example, "high-quality" content can relay that the content is aesthetically pleasing or technically sound, in that the data associated with the content produces a resolution, focus, pixel quality, size, dimension, color scheme, exposure, white balance and the like, or some combination thereof that satisfies the quality threshold.

As understood by those of skill in the art, the term or terms "relevant" or "highly-relevant," which may be used interchangeably, refers to an item of digital content satisfying a relevance threshold, which can be set by a user, site administrator, artist creating/capturing the content, the system, service or platform hosting the content, or some combination thereof. As discussed below, relevancy can be quantified (or scored). For example, a content file's relevancy to a user's interests can be determined via implementation of a logistic loss function which quantifies a content file's parameters or features.

Thus, the disclosed systems and methods provide the first fully automated social network. The disclosed systems and methods enable, in real-time (e.g., as the content is uploaded), the discovery and communication of high-quality, relevant visual content with no human moderation. The disclosed systems and methods analyze discovered content and discover interested users based on, for example, the information housed in users profiles. As a result, a media stream can be created and communicated to users that includes only content relevant to the users' interests, as content not determined relevant to the user's interests can be filtered out of the stream (or feed). This leads to higher quality and relevant content being returned to a user, which not only achieves satisfaction of the user's intent but also leads to increased user engagement respective to the content and/or site, service or application hosting/providing the content, as discussed herein.

As discussed in more detail below at least in relation to FIG. 6, according to some embodiments, information associated with, utilized in generating, and/or derived from a generated content/media stream (or feed), as discussed herein, can be used for monetization purposes and targeted advertising when providing, delivering, sharing or enabling access to the streaming media. Providing targeted advertising to users associated with such discovered content can lead to an increased click-through rate (CTR) of such ads and/or an increase in the advertiser's return on investment (ROI) for serving such content provided by third parties (e.g., digital advertisement content provided by an advertiser, where the advertiser can be a third party advertiser, or an entity directly associated with or hosting the systems and methods discussed herein).

Certain embodiments will now be described in greater detail with reference to the figures. In general, with reference to FIG. 1, a system 100 in accordance with an embodiment of the present disclosure is shown. FIG. 1 shows components of a general environment in which the systems and methods discussed herein may be practiced. Not all the components may be required to practice the disclosure, and variations in the arrangement and type of the components may be made without departing from the spirit or scope of the disclosure. As shown, system 100 of FIG. 1 includes local area networks ("LANs")/wide area networks ("WANs")—network 105, wireless network 110, mobile devices (client devices) 102-104 and client device 101. FIG. 1 additionally includes a variety of servers, such as content server 106, application (or "App") server 108, social networking server 120 and advertising ("ad") server 130.

One embodiment of mobile devices 102-104 is described in more detail below. Generally, however, mobile devices 102-104 may include virtually any portable computing device capable of receiving and sending a message over a network, such as network 105, wireless network 110, or the like. Mobile devices 102-104 may also be described generally as client devices that are configured to be portable. Thus, mobile devices 102-104 may include virtually any portable computing device capable of connecting to another computing device and receiving information. Such devices include multi-touch and portable devices such as, cellular telephones, smart phones, display pagers, radio frequency (RF) devices, infrared (IR) devices, Personal Digital Assistants (PDAs), handheld computers, laptop computers, wearable computers, smart watch, tablet computers, phablets, integrated devices combining one or more of the preceding devices, and the like. As such, mobile devices 102-104 typically range widely in terms of capabilities and features. For example, a cell phone may have a numeric keypad and a few lines of monochrome LCD display on which only text may be displayed. In another example, a web-enabled mobile device may have a touch sensitive screen, a stylus, and an HD display in which both text and graphics may be displayed.

A web-enabled mobile device may include a browser application that is configured to receive and to send web pages, web-based messages, and the like. The browser application may be configured to receive and display graphics, text, multimedia, and the like, employing virtually any web based language, including a wireless application protocol messages (WAP), and the like. In one embodiment, the browser application is enabled to employ Handheld Device Markup Language (HDML), Wireless Markup Language (WML), WMLScript, JavaScript, Standard Generalized Markup Language (SMGL), HyperText Markup Language (HTML), eXtensible Markup Language (XML), and the like, to display and send a message.

Mobile devices 102-104 also may include at least one client application that is configured to receive content from another computing device. The client application may include a capability to provide and receive textual content, graphical content, audio content, and the like. The client application may further provide information that identifies itself, including a type, capability, name, and the like. In one embodiment, mobile devices 102-104 may uniquely identify themselves through any of a variety of mechanisms, including a phone number, Mobile Identification Number (MIN), an electronic serial number (ESN), or other mobile device identifier.

In some embodiments, mobile devices 102-104 may also communicate with non-mobile client devices, such as client device 101, or the like. In one embodiment, such communications may include sending and/or receiving messages, searching for, viewing and/or sharing photographs, audio clips, video clips, or any of a variety of other forms of communications. Client device 101 may include virtually any computing device capable of communicating over a network to send and receive information. The set of such devices may include devices that typically connect using a wired or wireless communications medium such as personal computers, multiprocessor systems, microprocessor-based or programmable consumer electronics, network PCs, or the like. Thus, client device 101 may also have differing capabilities for displaying navigable views of information.

Client devices 101-104 computing device may be capable of sending or receiving signals, such as via a wired or wireless network, or may be capable of processing or storing signals, such as in memory as physical memory states, and may, therefore, operate as a server. Thus, devices capable of operating as a server may include, as examples, dedicated rack-mounted servers, desktop computers, laptop computers, set top boxes, integrated devices combining various features, such as two or more features of the foregoing devices, or the like.

Wireless network 110 is configured to couple mobile devices 102-104 and its components with network 105. Wireless network 110 may include any of a variety of wireless sub-networks that may further overlay stand-alone ad-hoc networks, and the like, to provide an infrastructure-oriented connection for mobile devices 102-104. Such sub-networks may include mesh networks, Wireless LAN (WLAN) networks, cellular networks, and the like.

Network 105 is configured to couple content server 106, application server 108, or the like, with other computing devices, including, client device 101, and through wireless network 110 to mobile devices 102-104. Network 105 is enabled to employ any form of computer readable media for communicating information from one electronic device to another. Also, network 105 can include the Internet in addition to local area networks (LANs), wide area networks (WANs), direct connections, such as through a universal serial bus (USB) port, other forms of computer-readable media, or any combination thereof. On an interconnected set of LANs, including those based on differing architectures and protocols, a router acts as a link between LANs, enabling messages to be sent from one to another, and/or other computing devices.

Within the communications networks utilized or understood to be applicable to the present disclosure, such networks will employ various protocols that are used for communication over the network. Signal packets communicated via a network, such as a network of participating digital communication networks, may be compatible with or compliant with one or more protocols. Signaling formats or protocols employed may include, for example, TCP/IP, UDP, QUIC (Quick UDP Internet Connection), DECnet, NetBEUI, IPX, APPLETALK™, or the like. Versions of the Internet Protocol (IP) may include IPv4 or IPv6. The Internet refers to a decentralized global network of networks. The Internet includes local area networks (LANs), wide area networks (WANs), wireless networks, or long haul public networks that, for example, allow signal packets to be communicated between LANs. Signal packets may be communicated between nodes of a network, such as, for example, to one or more sites employing a local network address. A signal packet may, for example, be communicated over the Internet from a user site via an access node coupled to the Internet. Likewise, a signal packet may be forwarded via network nodes to a target site coupled to the network via a network access node, for example. A signal packet communicated via the Internet may, for example, be routed via a path of gateways, servers, etc. that may route the signal packet in accordance with a target address and availability of a network path to the target address.

According to some embodiments, the present disclosure may also be utilized within or accessible to an electronic social networking site(s). A social network refers generally to an electronic network of individuals, such as acquaintances, friends, family, colleagues, or co-workers, which are coupled via a communications network or via a variety of sub-networks. Potentially, additional relationships may subsequently be formed as a result of social interaction via the communications network or sub-networks. In some embodiments, multi-modal communications may occur between members of the social network. Individuals within one or more social networks may interact or communication with other members of a social network via a variety of devices. Multi-modal communication technologies refers to a set of technologies that permit interoperable communication across multiple devices or platforms, such as cell phones, smart phones, tablet computing devices, phablets, personal computers, televisions, set-top boxes, SMS/MMS, email, instant messenger clients, forums, social networking sites, or the like.

In some embodiments, the disclosed networks 110 and/or 105 may comprise a content distribution network(s). A "content delivery network" or "content distribution network" (CDN) generally refers to a distributed content delivery system that comprises a collection of computers or computing devices linked by a network or networks. A CDN may employ software, systems, protocols or techniques to facilitate various services, such as storage, caching, communication of content, or streaming media or applications. A CDN may also enable an entity to operate or manage another's site infrastructure, in whole or in part.

The content server 106 may include a device that includes a configuration to provide content via a network to another device. A content server 106 may, for example, host a site or service, such as streaming media site/service, a gaming site, an email platform or social networking site, or a personal user site (such as a blog, vlog, online dating site, and the like). A content server 106 may also host a variety of other sites, including, but not limited to business sites, educational sites, dictionary sites, encyclopedia sites, wikis, financial sites, government sites, and the like. Devices that may operate as content server 106 include personal computers desktop computers, multiprocessor systems, microprocessor-based or programmable consumer electronics, network PCs, servers, and the like.

Content server 106 can further provide a variety of services that include, but are not limited to, streaming and/or downloading media services, search services, email services, photo services, web services, social networking services, news services, third-party services, audio services, video services, instant messaging (IM) services, SMS services, MMS services, FTP services, voice over IP (VOIP) services, or the like. Such services, for example a video application and/or video platform, can be provided via the application server 108, whereby a user is able to utilize such service upon the user being authenticated, verified or identified by the service. Examples of content may include images, text, audio, video, or the like, which may be processed in the form of physical signals, such as electrical signals, for example, or may be stored in memory, as physical states, for example.

An ad server 130 comprises a server that stores online advertisements for presentation to users. "Ad serving" refers to methods used to place online advertisements on websites, in applications, or other places where users are more likely to see them, such as during an online session or during computing platform use, for example. Various monetization techniques or models may be used in connection with sponsored advertising, including advertising associated with user. Such sponsored advertising includes monetization techniques including sponsored search advertising, non-sponsored search advertising, guaranteed and non-guaranteed delivery advertising, ad networks/exchanges, ad targeting, ad serving and ad analytics. Such systems can incorporate near instantaneous auctions of ad placement opportunities during web page creation, (in some cases in less than 500 milliseconds) with higher quality ad placement opportunities resulting in higher revenues per ad. That is advertisers will pay higher advertising rates when they believe their ads are being placed in or along with highly relevant content that is being presented to users. Reductions in the time needed to quantify a high quality ad placement offers ad platforms competitive advantages. Thus higher speeds and more relevant context detection improve these technological fields.

For example, a process of buying or selling online advertisements may involve a number of different entities, including advertisers, publishers, agencies, networks, or developers. To simplify this process, organization systems called "ad exchanges" may associate advertisers or publishers, such as via a platform to facilitate buying or selling of online advertisement inventory from multiple ad networks. "Ad networks" refers to aggregation of ad space supply from publishers, such as for provision en masse to advertisers. For web portals like Yahoo!®, advertisements may be displayed on web pages or in apps resulting from a user-defined search based at least in part upon one or more search terms. Advertising may be beneficial to users, advertisers or web portals if displayed advertisements are relevant to interests of one or more users. Thus, a variety of techniques have been developed to infer user interest, user intent or to subsequently target relevant advertising to users. One approach to presenting targeted advertisements includes employing demographic characteristics (e.g., age, income, sex, occupation, etc.) for predicting user behavior, such as by group. Advertisements may be presented to users in a targeted audience based at least in part upon predicted user behavior (s).

Another approach includes profile-type ad targeting. In this approach, user profiles specific to a user may be generated to model user behavior, for example, by tracking a user's path through a web site or network of sites, and compiling a profile based at least in part on pages or advertisements ultimately delivered. A correlation may be identified, such as for user purchases, for example. An identified correlation may be used to target potential purchasers by targeting content or advertisements to particular users. During presentation of advertisements, a presentation system may collect descriptive content about types of advertisements presented to users. A broad range of descriptive content may be gathered, including content specific to an advertising presentation system. Advertising analytics gathered may be transmitted to locations remote to an advertising presentation system for storage or for further evaluation. Where advertising analytics transmittal is not immediately available, gathered advertising analytics may be stored by an advertising presentation system until transmittal of those advertising analytics becomes available.

Servers 106, 108, 120 and 130 may be capable of sending or receiving signals, such as via a wired or wireless network, or may be capable of processing or storing signals, such as in memory as physical memory states. Devices capable of operating as a server may include, as examples, dedicated rack-mounted servers, desktop computers, laptop computers, set top boxes, integrated devices combining various features, such as two or more features of the foregoing devices, or the like. Servers may vary widely in configuration or capabilities, but generally, a server may include one or more central processing units and memory. A server may also include one or more mass storage devices, one or more power supplies, one or more wired or wireless network interfaces, one or more input/output interfaces, or one or more operating systems, such as Windows Server, Mac OS X, Unix, Linux, FreeB SD, or the like.

In some embodiments, users are able to access services provided by servers 106, 108, 120 and/or 130. This may include in a non-limiting example, game servers, authentication servers, search servers, email servers, social networking services servers, SMS servers, IM servers, MMS servers, exchange servers, photo-sharing services servers, and travel services servers, via the network 105 using their various devices 101-104. In some embodiments, applications, such as a social networking application, photo-sharing/storage application, a streaming video application, blog, or gaming application, can be hosted by the application server 108 (or content server 106, social networking server 120 and the like). Thus, the application server 108 can store various types of applications and application related information including application data and user profile information (e.g., identifying and behavioral information associated with a user). It should also be understood that content server 106 can also store various types of data related to the content and services provided by content server 106 in an associated content database 107, as discussed in more detail below. Embodiments exist where the network 105 is also coupled with/connected to a Trusted Search Server (TSS) which can be utilized to render content in accordance with the embodiments discussed herein. Embodiments exist where the TSS functionality can be embodied within servers 106, 108, 120 and/or 130.

Moreover, although FIG. 1 illustrates servers 106, 108, 120 and 130 as single computing devices, respectively, the disclosure is not so limited. For example, one or more functions of servers 106, 108, 120 and/or 130 may be distributed across one or more distinct computing devices. Moreover, in one embodiment, servers 106, 108, 120 and/or 130 may be integrated into a single computing device, without departing from the scope of the present disclosure.

Figure 2:
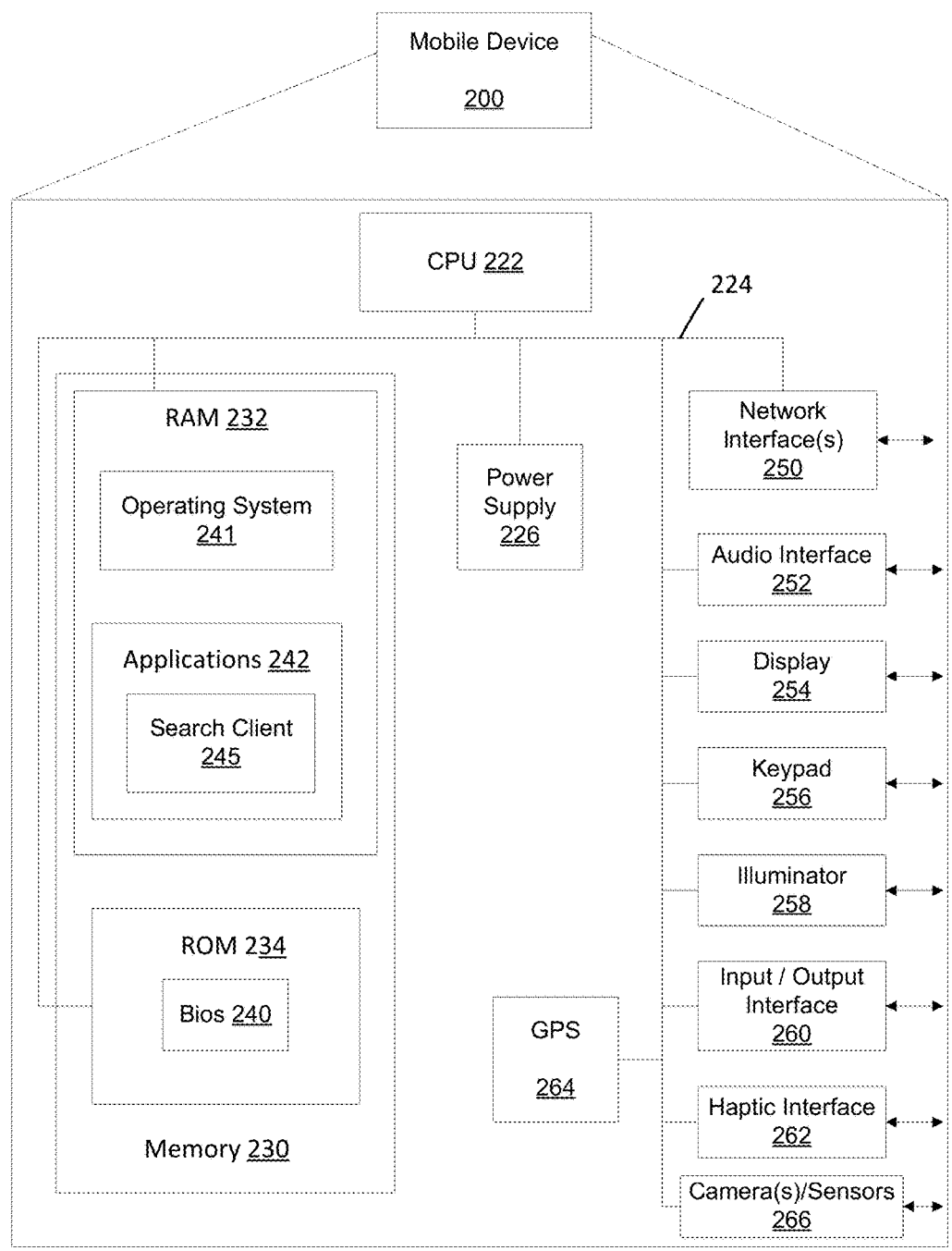
FIG. 2 depicts is a schematic diagram illustrating an example of client device in accordance with some embodiments of the present disclosure.

FIG. 2 is a schematic diagram illustrating a client device showing an example embodiment of a client device that may be used within the present disclosure. Client device 200 may include many more or less components than those shown in FIG. 2. However, the components shown are sufficient to disclose an illustrative embodiment for implementing the present disclosure. Client device 200 may represent, for example, client devices discussed above in relation to FIG. 1.

As shown in the figure, Client device 200 includes a processing unit (CPU) 222 in communication with a mass memory 230 via a bus 224. Client device 200 also includes a power supply 226, one or more network interfaces 250, an audio interface 252, a display 254, a keypad 256, an illuminator 258, an input/output interface 260, a haptic interface 262, an optional global positioning systems (GPS) receiver 264 and a camera(s) or other optical, thermal or electromagnetic sensors 266. Device 200 can include one camera/sensor 266, or a plurality of cameras/sensors 266, as understood by those of skill in the art. The positioning of the camera(s)/sensor(s) 266 on device 200 can change per device 200 model, per device 200 capabilities, and the like, or some combination thereof.

Power supply 226 provides power to Client device 200. A rechargeable or non-rechargeable battery may be used to provide power. The power may also be provided by an external power source, such as an AC adapter or a powered docking cradle that supplements and/or recharges a battery.

Client device 200 may optionally communicate with a base station (not shown), or directly with another computing device. Network interface 250 includes circuitry for coupling Client device 200 to one or more networks, and is constructed for use with one or more communication protocols and technologies as discussed above. Network interface 250 is sometimes known as a transceiver, transceiving device, or network interface card (NIC).

Audio interface 252 is arranged to produce and receive audio signals such as the sound of a human voice. For example, audio interface 252 may be coupled to a speaker and microphone (not shown) to enable telecommunication with others and/or generate an audio acknowledgement for some action. Display 254 may be a liquid crystal display (LCD), gas plasma, light emitting diode (LED), or any other type of display used with a computing device. Display 254 may also include a touch sensitive screen arranged to receive input from an object such as a stylus or a digit from a human hand.

Keypad 256 may comprise any input device arranged to receive input from a user. For example, keypad 256 may include a push button numeric dial, or a keyboard. Keypad 256 may also include command buttons that are associated with selecting and sending images. Illuminator 258 may provide a status indication and/or provide light. Illuminator 258 may remain active for specific periods of time or in response to events. For example, when illuminator 258 is active, it may backlight the buttons on keypad 256 and stay on while the client device is powered. Also, illuminator 258 may backlight these buttons in various patterns when particular actions are performed, such as dialing another client device. Illuminator 258 may also cause light sources positioned within a transparent or translucent case of the client device to illuminate in response to actions.

Client device 200 also comprises input/output interface 260 for communicating with external devices, such as a headset, or other input or output devices not shown in FIG. 2. Input/output interface 260 can utilize one or more communication technologies, such as USB, infrared, Bluetooth™, or the like. Haptic interface 262 is arranged to provide tactile feedback to a user of the client device. For example, the haptic interface may be employed to vibrate client device 200 in a particular way when the Client device 200 receives a communication from another user.

Optional GPS transceiver 264 can determine the physical coordinates of Client device 200 on the surface of the Earth, which typically outputs a location as latitude and longitude values. GPS transceiver 264 can also employ other geo-positioning mechanisms, including, but not limited to, triangulation, assisted GPS (AGPS), E-OTD, CI, SAI, ETA, BSS or the like, to further determine the physical location of Client device 200 on the surface of the Earth. It is understood that under different conditions, GPS transceiver 264 can determine a physical location within millimeters for Client device 200; and in other cases, the determined physical location may be less precise, such as within a meter or significantly greater distances. In one embodiment, however, Client device may through other components, provide other information that may be employed to determine a physical location of the device, including for example, a MAC address, Internet Protocol (IP) address, or the like.

Mass memory 230 includes a RAM 232, a ROM 234, and other storage means. Mass memory 230 illustrates another example of computer storage media for storage of information such as computer readable instructions, data structures, program modules or other data. Mass memory 230 stores a basic input/output system ("BIOS") 240 for controlling low-level operation of Client device 200. The mass memory also stores an operating system 241 for controlling the operation of Client device 200. It will be appreciated that this component may include a general purpose operating system such as a version of UNIX, or LINUX™, or a specialized client communication operating system such as Windows Client™, or the Symbian® operating system. The operating system may include, or interface with a Java virtual machine module that enables control of hardware components and/or operating system operations via Java application programs.

Memory 230 further includes one or more data stores, which can be utilized by Client device 200 to store, among other things, applications 242 and/or other data. For example, data stores may be employed to store information that describes various capabilities of Client device 200. The information may then be provided to another device based on any of a variety of events, including being sent as part of a header during a communication, sent upon request, or the like. At least a portion of the capability information may also be stored on a disk drive or other storage medium (not shown) within Client device 200.

Applications 242 may include computer executable instructions which, when executed by Client device 200, transmit, receive, and/or otherwise process audio, video, images, and enable telecommunication with a server and/or another user of another client device. Other examples of application programs or "apps" in some embodiments include browsers, calendars, contact managers, task managers, transcoders, photo management, database programs, word processing programs, security applications, spreadsheet programs, games, search programs, and so forth. Applications 242 may further include search client 245 that is configured to send, to receive, and/or to otherwise process a search query and/or search result using any known or to be known communication protocols. Although a single search client 245 is illustrated it should be clear that multiple search clients may be employed. For example, one search client may be configured to enter a search query message, where another search client manages search results, and yet another search client is configured to manage serving advertisements, IMs, emails, and other types of known messages, or the like.

Having described the components of the general architecture employed within the disclosed systems and methods, the components' general operation with respect to the disclosed systems and methods will now be described below.

Figure 3:
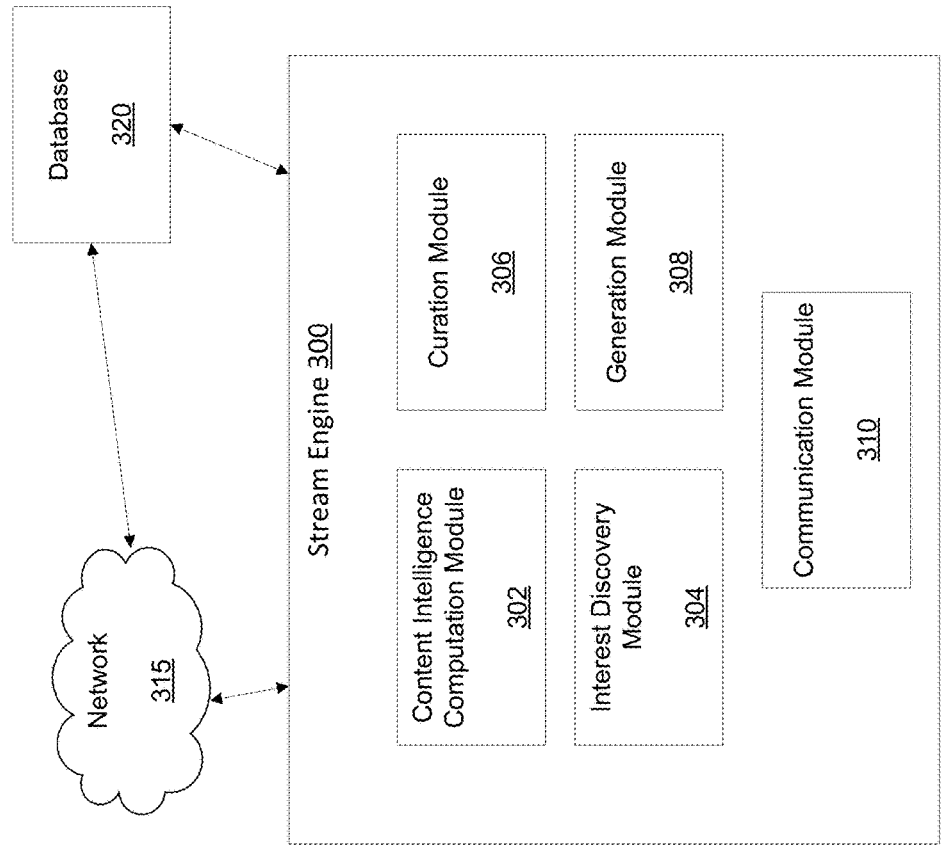
FIG. 3 is a schematic block diagram illustrating components of an exemplary system in accordance with embodiments of the present disclosure.

FIG. 3 is a block diagram illustrating the components for performing the systems and methods discussed herein. FIG. 3 includes a stream engine 300, network 315 and database 320. The stream engine 300 can be a special purpose machine or processor and could be hosted by an application server, content server, social networking server, web server, search server, content provider, email service provider, ad server, user's computing device, game server, and the like, or any combination thereof.

According to some embodiments, stream engine 300 can be embodied as a stand-alone application that executes on a user device. In some embodiments, the stream engine 300 can function as a downloadable application installed on the user's device, and in some embodiments, such application can be a web-based application accessed by the user device over a network. In some embodiments, the stream engine 300 can be installed as an augmenting script, program or application to another application (e.g., Tumblr®, Flickr®, Facebook®, Twitter®, and the like).

The database 320 can be any type of database or memory, and can be associated with a content server on a network (e.g., content server 106, social networking server 120 or application server 108 from FIG. 1) or a user's device (e.g., device 101-104 or device 200 from FIGS. 1-2). Database 320 comprises a dataset of data and metadata associated with local and/or network information related to users, services, applications, content, and the like. Such information can be stored and indexed in the database 320 independently and/or as a linked or associated dataset. As discussed above, it should be understood that the data (and metadata) in the database 320 can be any type of information and type, whether known or to be known, without departing from the scope of the present disclosure.

According to some embodiments, database 320 can store data for users, e.g., user data. According to some embodiments, the stored user data can include, but is not limited to, information associated with a user's profile, user interests, user behavioral information, user attributes, user preferences or settings, user demographic information, user location information, user biographic information, and the like, or some combination thereof. In some embodiments, the user data can also include, for purposes creating, streaming, recommending, rendering and/or delivering media, user device information, including, but not limited to, device identifying information, device capability information, voice/data carrier information, Internet Protocol (IP) address, applications installed or capable of being installed or executed on such device, and/or any, or some combination thereof. It should be understood that the data (and metadata) in the database 320 can be any type of information related to a user, content, a device, an application, a service provider, a content provider, whether known or to be known, without departing from the scope of the present disclosure.

According to some embodiments, database 320 can store data and metadata associated with media content from an assortment of media and/or service providers and/or platforms. For example, the information can be related to, but not limited to, content type of the media file, a category associated with the media, information associated with the pixels and frames of the media, information associated with the provider or hosting entity of the media, and any other type of known or to be known attribute or feature associated with a media file. Additionally, the media information in database 320 for each media file can comprise, but is not limited to, attributes including, but not limited to, popularity of the media, quality of the media, recency of the media (when it was published, shared, edited and the like), and the like. Such factors can be derived from information provided by the user, a service provider (i.e., Yahoo!® or Tumblr®), by the content/service providers providing media content (e.g., Netflix®, Hulu®, YouTube®), or by other third party services (e.g., rottentomatoes.com, IMDB™, Facebook®, Twitter® and the like), or some combination thereof.

According to some embodiments, as such media information is received, it can be stored in database 320 as an n-dimensional vector (or feature vector) representation for each media, where the information associated with the media can be translated as a node on the n-dimensional vector. Database 320 can store and index media information in database 320 as linked set of media data and metadata, where the data and metadata relationship can be stored as the n-dimensional vector. Such storage can be realized through any known or to be known vector or array storage, including but not limited to, a hash tree, queue, stack, VList, or any other type of known or to be known dynamic memory allocation technique or technology. While the storage discussion herein focuses on vector analysis, the stored information in database 320 can be analyzed, stored and indexed according to any known or to be known computational analysis technique or algorithm, such as, but not limited to, cluster analysis, data mining, Bayesian network analysis, Hidden Markov models, artificial neural network analysis, logical model and/or tree analysis, and the like.

For purposes of the present disclosure, content or media files (used interchangeably) as a whole are discussed within some embodiments; however, it should not be construed to limit the applications of the systems and methods discussed herein. That is, while reference is made throughout the instant disclosure to content or media files, such files should be understood to include any type of internet provided and/or user generated content (UGC), including, but not limited to, images, video, text, audio, multimedia, RSS feeds, graphics interchange format (GIF) files, short-term videos (e.g., Vine® videos), and the like, without departing from the scope of the instant application, which can thereby be communicated and/or accessed and processed by the stream engine 300 according to the systems and methods discussed herein.

As discussed above, with reference to FIG. 1, the network 315 can be any type of network such as, but not limited to, a wireless network, a local area network (LAN), wide area network (WAN), the Internet, or a combination thereof. The network 315 facilitates connectivity of the stream engine 300, and the database of stored resources 320. Indeed, as illustrated in FIG. 3, the stream engine 300 and database 320 can be directly connected by any known or to be known method of connecting and/or enabling communication between such devices and resources.

The principal processor, server, or combination of devices that comprises hardware programmed in accordance with the special purpose functions herein is referred to for convenience as stream engine 300, and includes content intelligence computation module 302, interest discovery module 304, curation module 306, generation module 308 and communication module 310. It should be understood that the engine(s) and modules discussed herein are non-exhaustive, as additional or fewer engines and/or modules (or submodules) may be applicable to the embodiments of the disclosed systems and methods. The operations, configurations and functionalities of each module, and their role within embodiments of the present disclosure will be discussed with reference to FIGS. 3-5.

As discussed in more detail below, the information processed by the stream engine 300 can be supplied to the database 320 in order to ensure that the information housed in the database 320 is up-to-date as the disclosed systems and methods leverage real-time information and/or behavior associated with the received streaming media feed, as discussed in more detail below.

Figure 4:
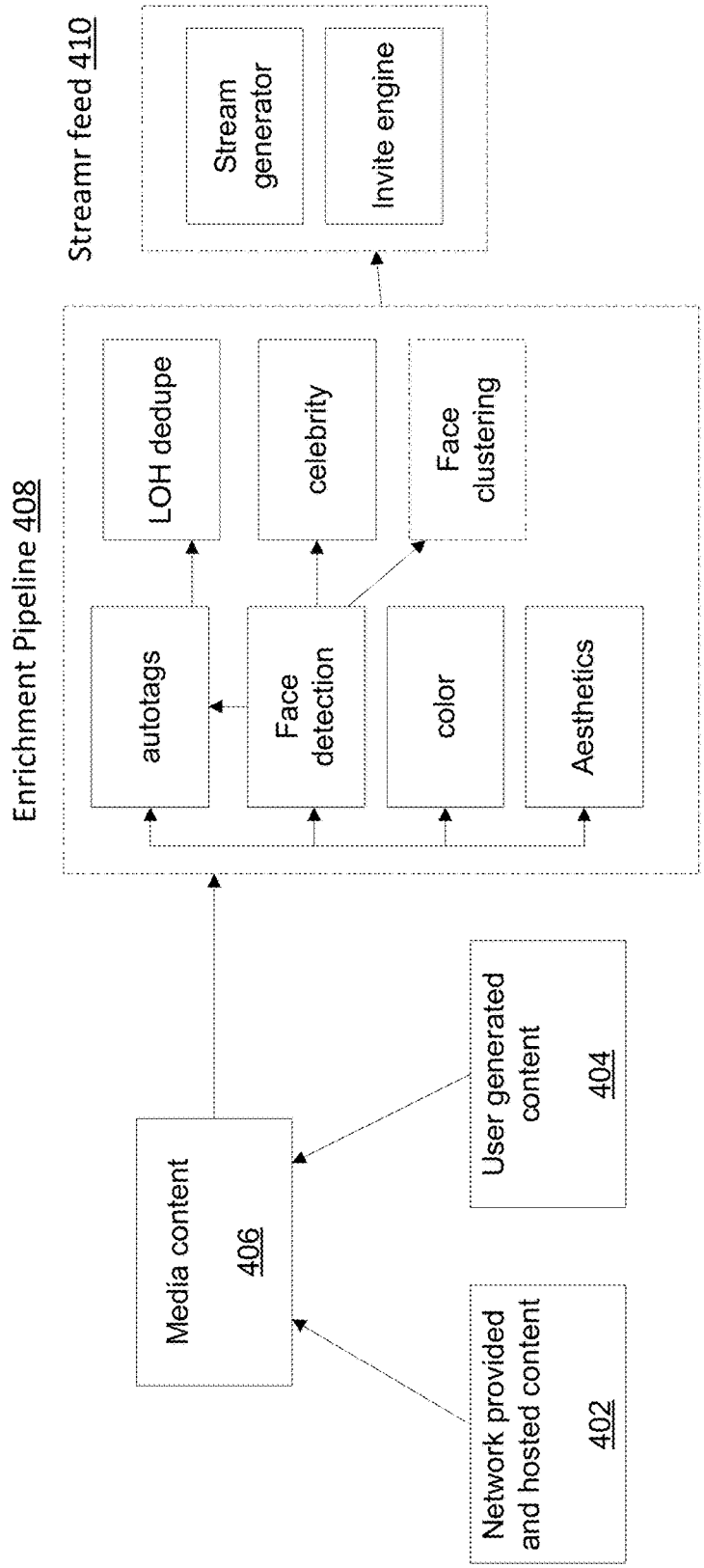
FIG. 4 is a schematic diagram illustrating components of an exemplary system in accordance with embodiments of the present disclosure.
Figure 5:
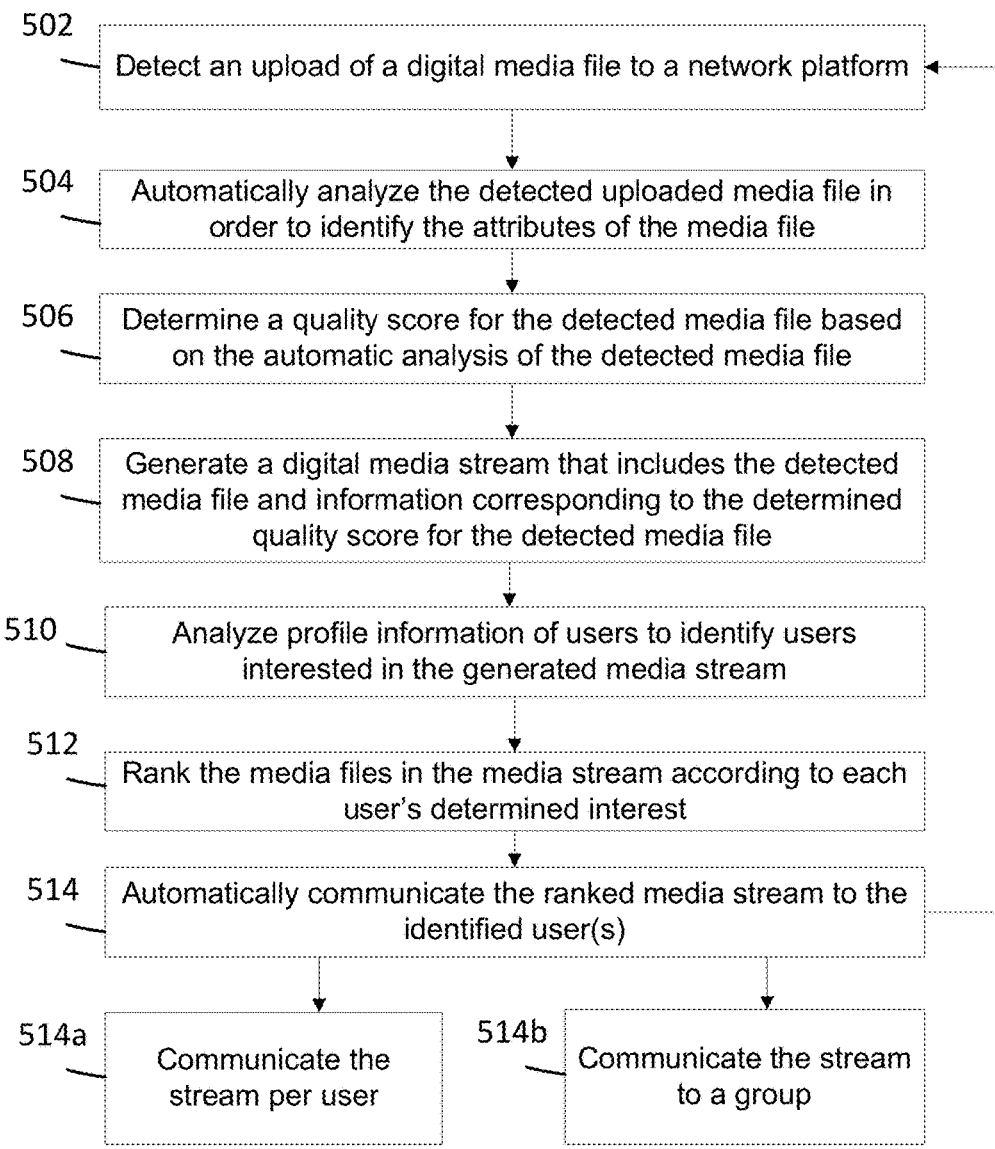
FIG. 5 is a flowchart illustrating steps performed in accordance with some embodiments of the present disclosure.

In accordance with the discussion above in relation to FIG. 3, and below in relation to Process 500 of FIG. 5, FIG. 4 provides an example schematic diagram of how media files are identified, analyzed then used as part of a generated feed (referred to in FIG. 4 as a Streamr™ feed).

As illustrated in FIG. 4, discovered (or detected as discussed below) media content 406 can be content 402, which can hosted on or provided by a network platform—for example, such content can be provided on a social networking platform, such as, for example, Tumblr® or Flickr®. The media content 406 can also be user generated content 404 that is uploaded and/or edited by users.

Once the media content is identified, as discussed in more detail below, the content is run through an enrichment pipeline 408 (also referred to as the content intelligence computation module 302 from FIG. 3). The enrichment pipeline 408, as discussed in more detail below with reference to Process 500, can analyze an identified media content file 406 and perform object recognition within the media content 406. Such recognition, as discussed in more detail below, can include, but is not limited to, detection of autotags, face (or facial) recognition, celebrity recognition based on facial detection, facial clustering based on such facial or celebrity detection, color detection/recognition, aesthetic recognition of a particular attribute within the content of a media file, and the like, or some combination thereof. Additionally, as discussed in more detail below, the enrichment pipeline 408 can perform a local optimized hash duplication ("LOH dedupe") technique in order to remove duplicate media files having the same (or similar to a threshold value) media content.

Once the media content has been analyzed—e.g., run through the enrichment pipeline 408 in order to analyze and identify attributes of the content—the media content 406 is then fed into the Streamr feed 410 (embodied as the generation module 308 and communication module 310 of FIG. 3). The streamr feed 410 includes a streamr generator and invite engine. As discussed in more detail below, the streamr generator of the streamr feed 410 can generate a media stream based on individual user interests (in a similar manner as the generation module 308, as discussed in more detail below). Additionally, the streamr feed 410 includes an invite engine that enables users to be invited to join groups based on their determined interests, as well as receive requests inviting them to allow their UGC to be uploaded to generated media streams or feeds, or group pages associated with a stream (in a similar manner as the communication module 310, as discussed in more detail below).

Turning to FIG. 5, Process 500 details some embodiments of automatically identifying and communicating media content to users as the media content is uploaded to the internet. As discussed herein, Process 500, which is performed by the stream engine 300, leverages an internet hosted data firehose in order to build and communicate streams of content, for a content feed, that are relevant to users' determined interests. For example, Flickr® can receive approximately 30 million photos in the Flickr® firehose daily. Real-time or near-real time analysis of the continuous stream of content results in curated media streams being created and communicated to users which leads to the stimulation of social interactivity between users and the automation of the discovery of other users and new content on a network, as discussed herein.

As discussed below, Steps 502-506 are performed by the content intelligence computation module 302 of the stream engine 300, Step 510 is performed by the interest discovery module 304, Step 512 is performed by the curation module 306, Step 508 is performed by the generation module 308, and Step 514, and Steps 514a and 514b are performed by the communication module 310.

According to some embodiments, Process 500, as executed by stream engine 300, can be performed on a grid of computer resources—for example, Flickr® or Tumblr®, which continuously generate a firehose of data, as discussed above. The stream engine 300 can perform Process 500 continuously or according to at a predetermined rate—for example, daily.

By way of a non-limiting example, user Bob has expressed an interest in photographs about horses. As discussed herein, such interests can be based on Bob's past network behavior (e.g., photo viewing history or searches) and/or can be based on information within his user profile. Another user, user Jim, is at the Kentucky Derby®. Jim and Bob are not friends on any social networking platform, and do not know each other (Jim lives in Lexington, Ky.) while Bob lives in Sunnyvale, Calif. Jim takes a photograph of the winner of the race and uploads this picture to his Flickr® account. The stream engine 300 automatically analyzes this photograph as it is uploaded and determines that Bob would be interested in viewing the picture. While Jim is uploading the picture, two of other users, Jane and Jill, have also uploaded pictures of the winning horse from different angles. Albert has also uploaded a video of the horse crossing the finishing line. Bob also does not known Jane, Jill or Albert. The stream engine 300 also automatically analyzes these media files and determines from their attributes that Bob would also like to view these files. The stream engine 300 then automatically generates a media stream or feed that includes the images from Jim, Jane and Jill and the video from Albert. This stream is then automatically communicated to Bob.

In some embodiments, the communication of the generated stream or feed can be sent directly to Bob's Flickr® page. In some embodiments, the stream can be pushed to Bob's mobile device for automatic rendering upon Bob opening the notification indicating the stream has been received or is available. In some embodiments, the stream can be accessible via a mobile application associated with the stream engine 300 (e.g., Tumblr® or Flickr®), and in some embodiments, the stream can additionally and/or alternatively be available via the network service location associated with the stream engine 300. In some embodiments, the generated stream can be stored in database 320 so that Bob can download or begin streaming the files on his own time.

In some embodiments, the stream can be communicated to the users through its automatic communication and upload to a group on a network platform—e.g., Flickr® or Tumblr®—resulting in display of the stream's media file's on the group page. In some embodiments, as discussed below, a new group can be created for the stream, and in some embodiments, the stream can be determined to be associated with an already existing group.

Continuing with the above example, upon delivery or communication of the generated media stream/feed to Bob, an invitation can be communication to Bob and/or the other users (e.g., Jim, Jane, Jill and Albert). The invitation can include a request for Bob and the other users to become friends (or followers) of each other on Flickr®. The invitation can also or alternatively include a request for Bob and the other users to join a created or already established group dedicated to "horses." Joining of such group can enable Bob and the other users to readily view other horse pictures as they become available to the Flickr® firehose, as well as communicate with one another via the group page.

While the above example utilizes Flickr® as the hosting platform for the stream engine 300, it should be understood that any known or to be known network platform can enable the sharing and/or communication of information as discussed above. Additionally, while a single network platform is discussed, it should not be construed as limiting, as any number of platforms can serve as a basis for discovering media for inclusion in a generated media stream. Indeed, the stream engine 300's capabilities can be effectuated across disparate network service providers and/or platforms so that users are being provided the highest-quality and relevant content available on the internet.

With the above example serving as a non-limiting embodiment of the disclosed systems and methods, Process 500 begins with Step 502 where, during monitoring of upload activity of users, a newly uploaded media file to a network platform is detected. In some embodiments, such detection can be based on a new data item being added to the firehose of a network platform—for example, Flickr® firehose; and in some embodiments, such detection can be based upon an indication provided to the network platform's server that a new content item has been uploaded to a user's page/account (or shared across the network, as discussed below). As discussed above, the media file can be any type of known or to be known media file, such as, for example, an image or video, and the network platform can be any type of known or to be known internet platform that hosts and/or communications media files for/to users (e.g., Flickr®, Tumblr®, Facebook®, WhatsApp®, SnapChat®, and the like).

In Step 504, the uploaded media file is analyzed in order to detect the resident attributes of the media file. In some embodiments, Step 504's analysis of the media file occurs automatically upon the detection occurring in Step 502. In some embodiments, the analysis of the detected media file can occur according to a predetermined time period or detected event, which can be set by a user, administrator, system, service provider, and the like, or some combination thereof.

According to some embodiments, the analysis of the media file occurring in Step 504 involves analyzing and processing the media file to identify the data and metadata (also referred to as media file information) of the media file. Such analysis includes parsing the media file and extracting the data within and associated with the media file (the data and metadata). In some embodiments, such analysis involves applying a "deep learning" algorithm in order to extract, determine or otherwise identify the data of the media file (i.e., the features and descriptors).

In accordance with embodiments of the present disclosure, "deep learning" (also referred to as deep structured learning or hierarchical learning) involves machine learning algorithms that model high-level abstractions in data by using model architectures composed of multiple non-linear transformations. Deep learning is part of a broader family of machine learning methods based on learning representations of data. A media file can be represented in many ways such as a vector of intensity values per pixel (as discussed above), or in a more conceptual way as a set of edges, regions of particular shape, and the like. The implementation of deep learning as part of the disclosed systems and methods enables the replacement of handcrafted features with efficient algorithms for unsupervised or semi-supervised feature learning and hierarchical feature extraction from media.

In some embodiments, Step 504's analysis can be implemented in real-time using software applying any known or to be known deep learning architecture or algorithmic technique, such as, but not limited to, deep neural networks, artificial neural networks (ANNs), convolutional neural networks (CNNs), and deep belief networks, and the like. According to some embodiments, as discussed in more detail below, the disclosed deep learning methodology employs CNNs and CNN classifiers (however, it should not be construed to limit the present disclosure to only the usage of CNNs, as any known or to be known deep learning architecture or algorithm is applicable to the disclosed systems and methods discussed herein). CNNs consist of multiple layers which can include: the convolutional layer, rectified linear unit (ReLU) layer, pooling layer, dropout layer and loss layer, as understood by those of skill in the art. When used for data discovery, recognition and similarity, CNNs produce multiple tiers of deep feature collections by analyzing small portions a media file.

For purposes of this disclosure, the discussion will reference vector representations of media files through use of CNNs; however, it should not be viewed as limiting as any type of known or to be known machine learning or deep learning analysis and/or transformation is applicable to the discussion herein without departing from the scope of the present disclosure.

For purposes of this disclosure, media data or information, also referred to as the attributes, features and/or descriptors of the media file can include, but are not limited to, tags or autotags of the file (e.g., for example, 1700 object classes of or associated with a media file and its renderable content), any known or to be known visual or aesthetic characteristics of the content within the media file, pixel information, color features, texture features, type features, edge features and/or shape features, social indicators, and/or any other type of data and/or metadata that describes the media file and/or the content depicted by the media file when it is rendered. The results of these collections are then tiled so that they overlap to obtain a representation of the data and metadata of media file; which is repeated for every CNN layer. CNNs may include local or global pooling layers, which combine the outputs of feature clusters.

One advantage of CNNs is the use of shared weight in convolutional layers; that is, the same filter (weights) is used for each pixel in each layer, thereby reducing required memory size and improving performance. Compared to other image classification algorithms, CNNs use relatively little pre-processing which avoids the dependence on prior-knowledge and the existence of difficult to design hand-crafted features.

It should be understood by those of skill in the art that the features (or attributes, descriptors or deep descriptors) of the media file can include any type of information contained in, or associated therewith, image data, video data, audio data, multimedia data, metadata, or any other known or to be known content that can be associated with, derived from or comprised within the media file (or content item). In some embodiments, such feature data can be audio data associated with an image (or media file) that plays when the image is viewed, for example. In another example, feature data can include comments or user feedback (e.g., comments on a social network) that is associated with not only an image file, for example, but also data associated with the source of the image file.

In Step 506, as a result of the analysis occurring in Step 504, a media file quality score (or value) is determined or computed for the detected media file. In some embodiments, the quality score corresponds to an aesthetic score for the content of the media file such that a higher quality score indicates a higher-quality media file.

In some embodiments, Step 506's quality score corresponds to measurements of the media data within the file. Such measurements, which can be computed via the CNN analysis above, can be based on, but are not limited to, object recognition within the content of the media file, scene recognition within the content of the media file, location translation within the content of the media file, aesthetic recognition of a particular attribute within the content of the media file, person recognition within the content of the media file, celebrity recognition within the content of the media file, adult content recognition within the content of the media file, face detection within the content of the media file, face clustering based on such face detection, text recognition within the content of the media file, and the like, or some combination thereof.

For example, using the range of scores from 0-10, where 0 is the lowest score and 10 is the highest: the analysis performed in Step 504 of a media file depicting a scene on the red carpet at the Oscars® can result in a low score if the category of analysis is for a landscape, and a high score if the category of analysis is for identifying a celebrity.

Therefore, in some embodiments, Step 506's quality score determination can include the determination of a category of content within the media file based on the analysis occurring in Step 504. That is, the analysis of the media file can be interpreted to determine a category or classifier of the content depicted by the content of the media file. Such interpretation can be based on a particular amount or set of media data satisfying a threshold associated with a particular category. In some embodiments, a category of a media file can be based on tags (e.g., hashtags or comments) associated with the content. Once this category is determined, the quality score can be properly determined in accordance with the appropriate category.

For example, using the above example of the Oscars® red carpet: if the uploaded image is of the cast of a movie, especially including the lead actor of the movie (e.g., from the face detection layer of the CNN), then the score would be high. However, if the image includes the hosts of the red carpet pre-show, then the score could be low (as one does not typically look at pictures of such events for depictions of the hosts of such events).

In some embodiments, the social indicators of an image can play a factor in whether a media file's score satisfies a threshold. For example, using the above example of the Oscars' hosts picture, while this image is scored low, the score could be elevated (or increased) due to social indicators identified from the media file's media data. That is, if the image was shared at or above a threshold amount, then the score could be increased according to an amount equivalent to the amount of shares within a predetermined period of time. For example, if the score of the image was 3 (out of 10), and the image has been shared 500 times within the past hour (e.g., it is viral), then the score could be doubled to 6, therefore, potentially satisfying the quality threshold.

In Step 508, a media stream is generated based on the results of Steps 504 and 506. That is, the detected media file and information associated with the quality score of the media file is added to a new (or existing) media stream. A new stream would be created if the image is for a new category, and/or has been detected (e.g., from Step 502) during a new monitoring time period. In some embodiments, the detected media file and its associated quality score can be configured as a linked set of data, where the quality score is appended to the media file within the stream as metadata. In some embodiments, the media stream can be populated by pointers to locations within database 320—for example, the location on the network where the detected media file was uploaded and an associated set of data created as a result of the quality score determination (which can also be stored in the database 320).

In some embodiments, when a detected media file's quality score is determined to be at or above a quality threshold, the media file is automatically included in a media stream. Therefore, in some embodiments, Step 508 can further involve comparing the quality score to the quality threshold in order to ensure that only high-quality media files are included in the media stream.

In some embodiments, as discussed in more detail below, when a detected media file's quality score satisfies the quality threshold, the media file is automatically included in the relevant group. For example, if there is a group page on Flickr® that displays images of celebrities, then should the detected media file have score at or above the quality threshold, such image could additionally be linked to such group page.

In Step 510, profile information about a set of users on a network is analyzed in order to identify users that are to receive the generated media stream. In some embodiments, the set of users can include those users having accounts on a particular content platform (e.g., Flickr®, Tumblr®, Facebook®, Twitter®, and the like, or some combination thereof).

As discussed above, user information relaying a user's interests can be stored in database 320. Such information, which can be stored, for example, as a feature vector, can be in the form of, for example, user profile information, declared user interests, user behavioral information, user attributes, user preferences or settings, user demographic information, user location information, user biographic information, and the like, or some combination thereof.

Thus, Step 510 can involve comparing the vectors of user information stored in database 320 against the vector representation of the media files of the media stream (as determined from the CNN analysis as discussed above), and those users' having a comparison result at or above a similarity threshold to the media file's vectors are identified.

In some embodiments, the comparison in Step 510 can be for a group of users. For example, for an established group on Flickr®: the comparison involves comparing the category of the group against the files in the stream in order to identify those files in the stream that are relevant to the category (which can also be determined by those files having higher quality scores—from Step 506).

In Step 512, the media files included in the media stream (generated in Step 508) are ranked (or re-ranked) according each of the determined interested of those users identified in Step 510. In some embodiments, the media streams are curated (e.g., personalized) per user so that an individual stream is communicated to an individual user such that the media files are ranked in descending order of interest for that user. Thus, those files having the higher comparison scores are slotted higher in the media stream (feed) than those with lower scores. As discussed above, in some embodiments, the ranking or re-ranking of the media stream can be for a group of users, where the collective interest of the group governs the ordering of the media files.

In some embodiments, a new media stream can be generated based on the ranking step, as some media files within the previously generated media stream may not satisfy an interest threshold for a particular user or group of users.

In some embodiments, which can be performed anytime within Process 500 or, for example, in conjunction with Step 508 and Step 512, a local optimized hash (LOH) function can be implemented by the stream engine 300 to ensure that duplicate media files (e.g., media files showing content at a similarity value at or above a similarity threshold) are removed from the stream. Thus, implementation of the LOH ensures that duplicate (or near duplicate) media files are removed so that the content within the stream is optimized for the user's viewing.

In Step 514, the ranked media stream is communicated to the identified user(s) or group. In some embodiments, the communication can be subject to a push notification to users associated with a group of the same category as the media files of the media stream. In some embodiments, the stream is communicated at or according to a predetermined rate (e.g., daily) so that users determined to be interested in particular content types can be kept apprised of new, relevant content. In some embodiments, the communication occurring in Step 514 can occur each time a new media file is detected and determined to be included in the media stream. Thus, Step 514 can comprise at least 2 forms of communication. The first, Step 514a, includes communication of the media stream to an individual user, such that each user determined to be interested receives a personalized media stream (where the media files in the media stream are organized according to rankings respective to the specific user's interests). The second, Step 514b, includes communication of the media stream to an established (or created) group, such that users associated with the group receive a group-level personalized media stream.

As discussed above, according to some embodiments, the communication can include an invitation for those users receiving the media stream to communicate with each other. In some embodiments, the invitation can involve the creation of a dedicated or new group that includes only those users receiving the communication in Step 514. In some embodiments, the invitation can be for an existing group, as discussed above. Therefore, since the users receiving the same media stream (which at most may be ordered differently) have the same interests, the invitation accompanying the communication for the users to interact has a high probability of being accepted, as users are more likely to communicate/interact with other users when they share similar interests. In some embodiments, the interactivity between users can occur via the platform for which the users are receiving the communication (and invitation)—for example, Flickr®. Therefore, activity and user engagement on such platform(s) can increase as a by-product of the stream engine 300 being implemented on such platform(s).

According to some embodiments of the present disclosure, information associated with and/or utilized during the generation of the content (or media) stream (or feed), as discussed above in relation to Process 500 of FIG. 5, can be fed back to the stream engine 300 for modeling (or training) of the information stored in database 320 via iterative or recursive bootstrapping or aggregation functionality (as indicated by the arrow pointing from Step 514 back to Step 502 which indicates that upon detection of another media file, Process 500 can be performed again). This can improve the accuracy of the discovery and identification of media files that are to be included in generated media streams. Embodiments of the present disclosure involve the stream engine 300 applying such recursive/bootstrapping functions utilizing any known or to be known open source and/or commercial software machine learning algorithm, technique or technology.

Figure 6:
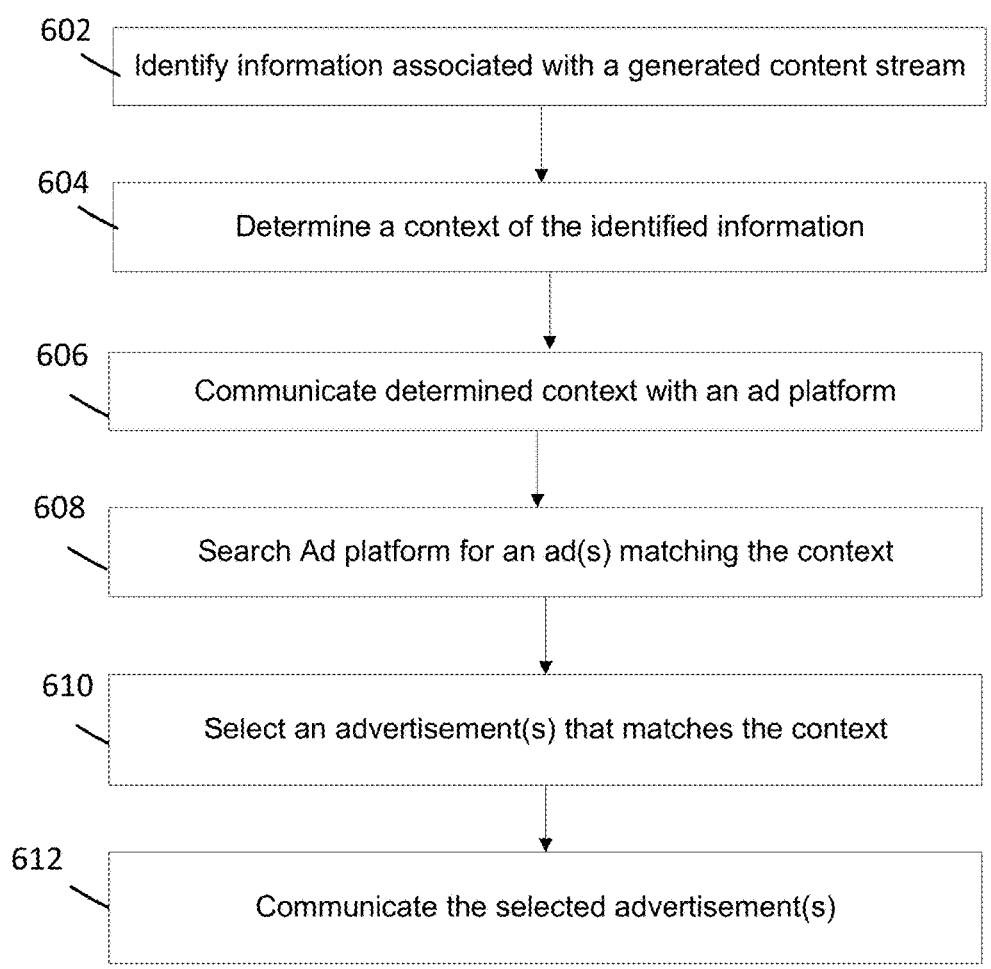
FIG. 6 is a flowchart illustrating steps performed in accordance with some embodiments of the present disclosure.

FIG. 6 is a work flow example 600 for serving relevant digital content comprising advertisements (e.g., advertisement content) based on the information associated with an a generated stream of content (or feed), as discussed above. Such information, referred to as "generated content stream information" for reference purposes only, can include, but is not limited to, the identity of the content within the stream, the attributes of the individual content files in the stream and/or stream as a whole, the attributes of the users receiving the stream, and the like, and/or some combination thereof.

As discussed herein, reference to an "advertisement" should be understood to include, but not be limited to, digital content that provides information provided by another user, service, third party, entity, and the like. Such digital ad content can include any type of media renderable by a computing device, including, but not limited to, video, text, audio, images, and/or any other type of known or to be known multi-media. In some embodiments, the digital ad content can be formatted as hyperlinked multi-media content that provides deep-linking features and/or capabilities.

By way of a non-limiting example, work flow 600 includes a user being provided with a generated stream of content having images from a professional baseball game. Based on information related to the determination and generation of the stream of content, for example, the user may be provided with digital ad content related to the purchase of tickets to an upcoming game. In another example, the digital ad content can be related to coupons for baseball apparel. That is, the image content in the stream includes the players wearing New Era® baseball hats, therefore, the digital ad content can comprise information related to promotions for purchasing such hats.

In Step 602, generated content stream information associated with a created content stream is identified. As discussed above, the generated content stream information can be based on the generated content stream process outlined above with respect to FIGS. 3-5. For purposes of this disclosure, Process 600 will refer to single content stream as the basis for serving an advertisement(s); however, it should not be construed as limiting, as any number of content streams (or feeds), and/or quantities of information related to users and their interaction with the streaming media can form such basis, without departing from the scope of the instant disclosure.

In Step 604, a context is determined based on the identified generated content stream information. This context forms a basis for serving advertisements related to the generated content stream information. In some embodiments, the context can be determined by determining a category which the generated content stream information of Step 602 represents. For example, the category can be related to the type of media provided within the stream. In some embodiments, the identification of the context from Step 604 can occur before, during and/or after the analysis detailed above with respect to Process 500, or some combination thereof.

In Step 606, the context (e.g., content/context data) is communicated (or shared) with an advertisement platform comprising an advertisement server 130 and ad database. Upon receipt of the context, the advertisement server 130 performs a search for a relevant advertisement within the associated ad database. The search for an advertisement is based at least on the identified context.

In Step 608, the advertisement server 130 searches the ad database for an advertisement(s) that matches the identified context. In Step 610, an advertisement is selected (or retrieved) based on the results of Step 608. In some embodiments, the selected advertisement can be modified to conform to attributes of the page, message or method upon which the advertisement will be displayed, and/or to the application and/or device for which it will be displayed. In some embodiments, the selected advertisement is shared or communicated via the application the user is utilizing to render the content/media stream. Step 612. In some embodiments, the selected advertisement is sent directly to each user's computing device. In some embodiments, the selected advertisement is displayed in conjunction with a rendered content file (e.g., the rendered and displayed media files of the stream) on the user's device and/or within the application being used to identify, select and/or render the content/media stream. In some embodiments, the digital ad file can be inserted into the content stream so that it is rendered between media files of the stream or superimposed over content within the stream.

Figure 7:
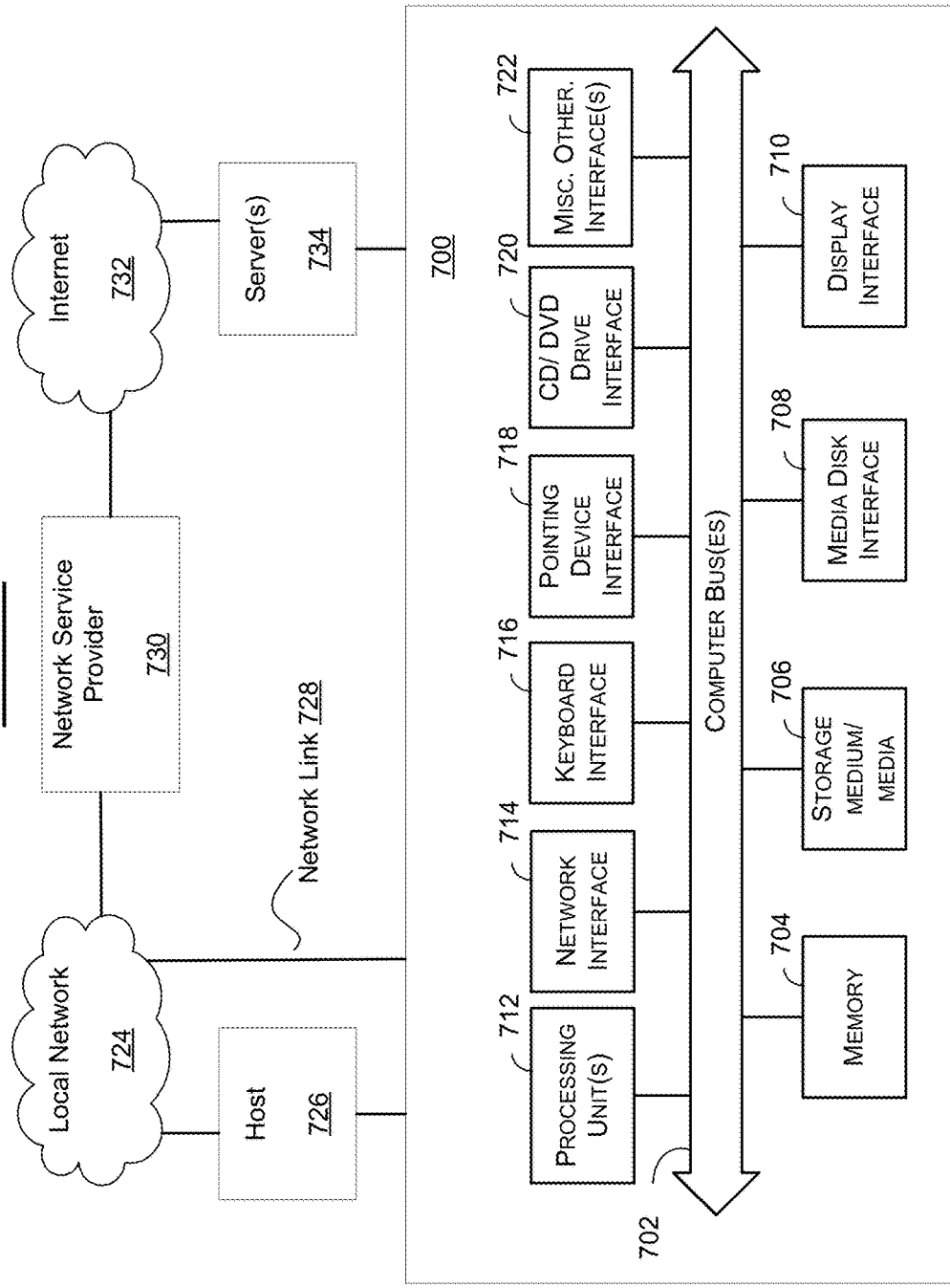
FIG. 7 is a block diagram illustrating the architecture of an exemplary hardware device in accordance with one or more embodiments of the present disclosure.

As shown in FIG. 7, internal architecture 700 of a computing device(s), computing system, computing platform, user devices, set-top box, smart TV and the like includes one or more processing units, processors, or processing cores, (also referred to herein as CPUs) 712, which interface with at least one computer bus 702. Also interfacing with computer bus 702 are computer-readable medium, or media, 706, network interface 714, memory 704, e.g., random access memory (RAM), run-time transient memory, read only memory (ROM), media disk drive interface 720 as an interface for a drive that can read and/or write to media including removable media such as floppy, CD-ROM, DVD, media, display interface 710 as interface for a monitor or other display device, keyboard interface 716 as interface for a keyboard, pointing device interface 718 as an interface for a mouse or other pointing device, and miscellaneous other interfaces not shown individually, such as parallel and serial port interfaces and a universal serial bus (USB) interface.

Memory 704 interfaces with computer bus 702 so as to provide information stored in memory 704 to CPU 712 during execution of software programs such as an operating system, application programs, device drivers, and software modules that comprise program code, and/or computer executable process steps, incorporating functionality described herein, e.g., one or more of process flows described herein. CPU 712 first loads computer executable process steps from storage, e.g., memory 704, computer readable storage medium/media 706, removable media drive, and/or other storage device. CPU 712 can then execute the stored process steps in order to execute the loaded computer-executable process steps. Stored data, e.g., data stored by a storage device, can be accessed by CPU 712 during the execution of computer-executable process steps.

Persistent storage, e.g., medium/media 706, can be used to store an operating system and one or more application programs. Persistent storage can also be used to store device drivers, such as one or more of a digital camera driver, monitor driver, printer driver, scanner driver, or other device drivers, web pages, content files, playlists and other files. Persistent storage can further include program modules and data files used to implement one or more embodiments of the present disclosure, e.g., listing selection module(s), targeting information collection module(s), and listing notification module(s), the functionality and use of which in the implementation of the present disclosure are discussed in detail herein.

Network link 728 typically provides information communication using transmission media through one or more networks to other devices that use or process the information. For example, network link 728 may provide a connection through local network 724 to a host computer 726 or to equipment operated by a Network or Internet Service Provider (ISP) 730. ISP equipment in turn provides data communication services through the public, worldwide packet-switching communication network of networks now commonly referred to as the Internet 732.

A computer called a server host 734 connected to the Internet 732 hosts a process that provides a service in response to information received over the Internet 732. For example, server host 734 hosts a process that provides information representing video data for presentation at display 710. It is contemplated that the components of system 700 can be deployed in various configurations within other computer systems, e.g., host and server.

At least some embodiments of the present disclosure are related to the use of computer system 700 for implementing some or all of the techniques described herein. According to one embodiment, those techniques are performed by computer system 700 in response to processing unit 712 executing one or more sequences of one or more processor instructions contained in memory 704. Such instructions, also called computer instructions, software and program code, may be read into memory 704 from another computer-readable medium 706 such as storage device or network link. Execution of the sequences of instructions contained in memory 704 causes processing unit 712 to perform one or more of the method steps described herein. In alternative embodiments, hardware, such as ASIC, may be used in place of or in combination with software. Thus, embodiments of the present disclosure are not limited to any specific combination of hardware and software, unless otherwise explicitly stated herein.

The signals transmitted over network link and other networks through communications interface, carry information to and from computer system 700. Computer system 700 can send and receive information, including program code, through the networks, among others, through network link and communications interface. In an example using the Internet, a server host transmits program code for a particular application, requested by a message sent from computer, through Internet, ISP equipment, local network and communications interface. The received code may be executed by processor 702 as it is received, or may be stored in memory 704 or in storage device or other non-volatile storage for later execution, or both.

For the purposes of this disclosure a module is a software, hardware, or firmware (or combinations thereof) system, process or functionality, or component thereof, that performs or facilitates the processes, features, and/or functions described herein (with or without human interaction or augmentation). A module can include sub-modules. Software components of a module may be stored on a computer readable medium for execution by a processor. Modules may be integral to one or more servers, or be loaded and executed by one or more servers. One or more modules may be grouped into an engine or an application.

For the purposes of this disclosure the term "user", "subscriber" "consumer" or "customer" should be understood to refer to a user of an application or applications as described herein and/or a consumer of data supplied by a data provider. By way of example, and not limitation, the term "user" or "subscriber" can refer to a person who receives data provided by the data or service provider over the Internet in a browser session, or can refer to an automated software application which receives the data and stores or processes the data.

Those skilled in the art will recognize that the methods and systems of the present disclosure may be implemented in many manners and as such are not to be limited by the foregoing exemplary embodiments and examples. In other words, functional elements being performed by single or multiple components, in various combinations of hardware and software or firmware, and individual functions, may be distributed among software applications at either the client level or server level or both. In this regard, any number of the features of the different embodiments described herein may be combined into single or multiple embodiments, and alternate embodiments having fewer than, or more than, all of the features described herein are possible.

Functionality may also be, in whole or in part, distributed among multiple components, in manners now known or to become known. Thus, myriad software/hardware/firmware combinations are possible in achieving the functions, features, interfaces and preferences described herein. Moreover, the scope of the present disclosure covers conventionally known manners for carrying out the described features and functions and interfaces, as well as those variations and modifications that may be made to the hardware or software or firmware components described herein as would be understood by those skilled in the art now and hereafter.

Furthermore, the embodiments of methods presented and described as flowcharts in this disclosure are provided by way of example in order to provide a more complete understanding of the technology. The disclosed methods are not limited to the operations and logical flow presented herein. Alternative embodiments are contemplated in which the order of the various operations is altered and in which sub-operations described as being part of a larger operation are performed independently.

While various embodiments have been described for purposes of this disclosure, such embodiments should not be deemed to limit the teaching of this disclosure to those embodiments. Various changes and modifications may be made to the elements and operations described above to obtain a result that remains within the scope of the systems and processes described in this disclosure.

What is claimed is:

1. A method comprising steps of:

detecting, via a social networking server over a network, an upload of a digital media file by a second user to a network platform that is in communication with the social networking server via the network, said detection comprising analyzing a data firehose associated with said network platform and identifying the digital media file as a new media file in the firehose;

automatically analyzing upon detection of the digital media file upload, via the social networking server, said uploaded media file, said analysis comprising the social networking server running the media file through software defining a convolutional neural network (CNN) which at least in part results in the social networking server parsing said media file, identifying information associated with the media file, and determining a quality value of the uploaded media file based on the identified information, said quality value providing an indication as to a categorical quality of the uploaded media file;

comparing, via the social networking server, said quality value of the uploaded digital media file to a quality threshold for said category, said comparison comprising a determination indicating whether the quality value of the uploaded media file satisfies the quality threshold;

generating, via the social networking server, a new media feed comprising a set of digital media files each having a quality value satisfying the quality threshold, said set of digital media files including said uploaded media file when said quality value for said uploaded media file satisfies said quality threshold;

analyzing, via the social networking server, user profile information of users on said network platform, said analysis comprising comparing said user profile information against media information of the digital media files in the media feed and identifying a set of users having interests related to content of the media feed; and automatically communicating, via the social networking server, said media feed to the identified set of users.

2. The method of claim 1, further comprising:

automatically ranking the digital media files in said media feed based on the interests of the identified set of users.

3. The method of claim 2, further comprising:

generating, for each user identified in said set of users, a second media feed from said generated media feed, said generation comprising modifying said media feed for delivery to each user in the set of users based on said ranking, said modification comprising organizing the media files in the media feed according to the interests of each user upon said communication.

4. The method of claim 1, further comprising:

determining social indicators from said information of said media file; and adjusting said quality value based on said social indicators.

5. The method of claim 1, wherein said uploaded digital media file is included in the media feed only upon satisfaction of said quality threshold.

6. The method of claim 1, wherein said detection comprises:
monitoring said network for identification of an indication that said media file has been uploaded by the second user, wherein said monitoring occurs according to a predetermined time period associated with said firehose.

7. The method of claim 1, wherein said application of said CNN software results in translating the information of the media file into a feature vector for the media file, wherein said generated media feed further comprises information corresponding to said media file vector.

8. The method of claim 7, wherein said user profile information is stored in a database on said network in association with said network platform as a vector.

9. The method of claim 8, wherein said comparison comprises comparing the vectors of the user profile information against the vector of the media file.

10. The method of claim 1, wherein said information of the media file is associated at least with content of the media file, wherein said information comprises data and metadata corresponding to the aesthetics of the content of the media file.

11. The method of claim 1, further comprising:
communicating to the second user an invite to include said uploaded digital media file in said generated media feed; and
receiving, in response to said invite, a response from said second user, wherein said uploaded digital media file is included in said media feed based on said second user response.

12. The method of claim 1, further comprising:
communicating to the second user an invite to join a group associated with said media feed and hosted by the network platform, said invite enables the second user to view said generated media stream on a webpage associated with said group.

13. The method of claim 1, further comprising:
determining a context of the media feed based on said content of the media feed;
causing communication, over the network, of said context to an advertisement platform to obtain digital advertisement content associated with said context; and
communicating a digital content object comprising said identified digital advertisement content with said media feed.

14. A non-transitory computer-readable storage medium tangibly encoded with computer-executable instructions, that when executed by a processor associated with a social networking server, performs a method comprising:
detecting, via the social networking server over a network, an upload of a digital media file by a second user to a network platform that is in communication with the social networking server via the network, said detection comprising analyzing a data firehose associated with said network platform and identifying the digital media file as a new media file in the firehose;
automatically analyzing upon detection of the digital media file upload, via the social networking server, said uploaded media file, said analysis comprising the social networking server running the media file through software defining a convolutional neural network (CNN) which at least in part results in the social networking server parsing said media file, identifying information associated with the media file, and determining a quality value of the uploaded media file based on the identified information, said quality value providing an indication as to a categorical quality of the uploaded media file;
comparing, via the social networking server, said quality value of the uploaded digital media file to a quality threshold for said category, said comparison comprising a determination indicating whether the quality value of the uploaded media file satisfies the quality threshold;
generating, via the social networking server, a new media feed comprising a set of digital media files each having a quality value satisfying the quality threshold, said set of digital media files including said uploaded media file when said quality value for said uploaded media file satisfies said quality threshold;
analyzing, via the social networking server, user profile information of users on said network platform, said analysis comprising comparing said user profile information against media information of the digital media files in the media feed and identifying a set of users having interests related to content of the media feed; and
automatically communicating, via the social networking server, said media feed to the identified set of users.

15. The non-transitory computer-readable storage medium of claim 14, further comprising:
automatically ranking the digital media files in said media feed based on the interests of the identified set of users.

16. The non-transitory computer-readable storage medium of claim 15, further comprising:
generating, for each user identified in said set of users, a second media feed from said generated media feed, said generation comprising modifying said media feed for delivery to each user in the set of users based on said ranking, said modification comprising organizing the media files in the media feed according to the interests of each user upon said communication.

17. The non-transitory computer-readable storage medium of claim 14, wherein said application of said CNN software results in translating the information of the media file into a feature vector for the media file, wherein said generated media feed further comprises information corresponding to said media file vector, wherein said user profile information is stored in a database on said network in association with said network platform as a vector, wherein said comparison comprises comparing the vectors of the user profile information against the vector of the media file.

18. The non-transitory computer-readable storage medium of claim 14, further comprising:
communicating to the second user an invite to include said uploaded digital media file in said generated media feed; and
receiving, in response to said invite, a response from said second user, wherein said uploaded digital media file is included in said media feed based on said second user response.

19. The non-transitory computer-readable storage medium of claim 14, further comprising:
communicating to the second user an invite to join a group associated with said media feed and hosted by the network platform, said invite enables the second user to view said generated media stream on a webpage associated with said group.

20. A server computing device comprising:
a processor;
a non-transitory computer-readable storage medium for tangibly storing thereon program logic for execution by the processor, the program logic comprising:
  logic executed by the processor for detecting, via the social networking server over a network, an upload of a digital media file by a second user to a network platform that is in communication with the social networking server via the network, said detection comprising analyzing a data firehose associated with said network platform and identifying the digital media file as a new media file in the firehose;
  logic executed by the processor for automatically analyzing upon detection of the digital media file upload, via the social networking server, said uploaded media file, said analysis comprising the social networking server running the media file through software defining a convolutional neural network (CNN) which at least in part results in the social networking server parsing said media file, identifying information associated with the media file, and determining a quality value of the uploaded media file based on the identified information, said quality value providing an indication as to a categorical quality of the uploaded media file;
  logic executed by the processor for comparing, via the social networking server, said quality value of the uploaded digital media file to a quality threshold for said category, said comparison comprising a determination indicating whether the quality value of the uploaded media file satisfies the quality threshold;
  logic executed by the processor for generating, via the social networking server, a new media feed comprising a set of digital media files each having a quality value satisfying the quality threshold, said set of digital media files including said uploaded media file when said quality value for said uploaded media file satisfies said quality threshold;
  logic executed by the processor for analyzing, via the social networking server, user profile information of users on said network platform, said analysis comprising comparing said user profile information against media information of the digital media files in the media feed and identifying a set of users having interests related to content of the media feed; and
  logic executed by the processor for automatically communicating, via the social networking server, said media feed to the identified set of users.

* * * * *